(12) United States Patent
Kim et al.

(10) Patent No.: US 10,949,003 B2
(45) Date of Patent: *Mar. 16, 2021

(54) DISPLAY APPARATUS FOR INDIVIDUALLY CONTROLLING TRANSPARENCY AND RENDERING STATE OF EACH OF A PLURALITY OF AREAS AND DISPLAY METHOD THEREOF

(71) Applicant: SAMSUNG ELECTRONICS CO., LTD., Suwon-si (KR)

(72) Inventors: Byung-chul Kim, Suwon-si (KR); Sung-hyun Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,230

(22) Filed: Nov. 16, 2018

(65) Prior Publication Data

US 2019/0101997 A1 Apr. 4, 2019

Related U.S. Application Data

(63) Continuation of application No. 14/744,224, filed on Jun. 19, 2015, now Pat. No. 10,133,373.

(30) Foreign Application Priority Data

Oct. 20, 2014 (KR) .......................... 10-2014-0141659

(51) Int. Cl.
*G06F 3/041* (2006.01)
*G06F 1/16* (2006.01)
(Continued)

(52) U.S. Cl.
CPC ............ *G06F 3/041* (2013.01); *G06F 1/1643* (2013.01); *G06F 1/1652* (2013.01); *G06F 3/013* (2013.01);
(Continued)

(58) Field of Classification Search
CPC .... G06F 1/1641; G06F 1/1643; G06F 1/1652; G06F 3/013; G06F 3/041; G06F 3/0488;
(Continued)

(56) References Cited

U.S. PATENT DOCUMENTS 8,654,087 B2 2/2014 Kang et al.
8,654,095 B1 2/2014 Cho et al.
(Continued)

FOREIGN PATENT DOCUMENTS

KR 1020090095682 A 9/2009
KR 1020100065418 A 6/2010
(Continued)

OTHER PUBLICATIONS

Communication dated Mar. 3, 2020, issued by the Korean Intellectual Property Office in corresponding Korean Application No. 10-2014-0141659.

*Primary Examiner* — Keith L Crawley
(74) *Attorney, Agent, or Firm* — Sughrue Mion, PLLC

(57) ABSTRACT

A display apparatus is provided. The display apparatus includes: a display that has an adjustable transparency; a sensor configured to detect bending of the display; and a controller configured to recognize the display as being divided into a plurality of areas based on the detected bending, and individually control the transparency and a rendering state of each of the plurality of areas.

20 Claims, 24 Drawing Sheets

(51) Int. Cl.
   *G06F 3/0488* (2013.01)
   *G06F 3/01* (2006.01)

(52) U.S. Cl.
   CPC ........ *G06F 3/0488* (2013.01); *G06F 3/04886* (2013.01); *G06F 2203/04102* (2013.01); *G06F 2203/04803* (2013.01); *G06F 2203/04808* (2013.01); *G09G 2380/02* (2013.01)

(58) Field of Classification Search
   CPC . G06F 2203/04102; G06F 2203/04803; G06F 2203/04804; G06F 2203/04808; G09G 5/12; G09G 2356/00; G09G 2380/02
   See application file for complete search history.

(56) References Cited

U.S. PATENT DOCUMENTS

| | | | |
|---|---|---|---|
| 8,666,455 B2 | 3/2014 | Song | |
| 8,890,771 B2 | 11/2014 | Pance | |
| 8,988,381 B1 * | 3/2015 | Kim | G06F 1/1652 345/108 |
| 2010/0053071 A1 | 3/2010 | Cohen | |
| 2010/0060548 A1 | 3/2010 | Choi | |
| 2010/0164888 A1 | 7/2010 | Okumura | |
| 2010/0313150 A1 | 12/2010 | Morris | |
| 2011/0163986 A1 | 7/2011 | Lee et al. | |
| 2012/0060089 A1 | 3/2012 | Heo | |
| 2013/0027364 A1 | 1/2013 | Kim | |
| 2013/0127918 A1 | 5/2013 | Kang | |
| 2013/0145311 A1 | 6/2013 | Joo | |
| 2013/0215088 A1 | 8/2013 | Son et al. | |
| 2013/0314338 A1 | 11/2013 | Nam et al. | |
| 2014/0028596 A1 * | 1/2014 | Seo | G06F 3/0487 345/173 |
| 2014/0035869 A1 | 2/2014 | Yun | |
| 2014/0043209 A1 | 2/2014 | Walker | |
| 2014/0062919 A1 | 3/2014 | Park | |
| 2014/0118317 A1 | 5/2014 | Song | |
| 2014/0123038 A1 | 5/2014 | Ahn | |
| 2014/0187227 A1 | 7/2014 | Song | |
| 2014/0218321 A1 * | 8/2014 | Lee | G06F 1/1643 345/173 |
| 2014/0306908 A1 | 10/2014 | Nagaraju | |
| 2015/0022436 A1 | 1/2015 | Cho | |
| 2015/0062175 A1 | 3/2015 | Kim | |
| 2016/0085319 A1 | 3/2016 | Kim | |
| 2016/0179236 A1 | 6/2016 | Shin | |
| 2016/0232856 A1 * | 8/2016 | Hidaka | G09G 3/20 |

FOREIGN PATENT DOCUMENTS

| | | |
|---|---|---|
| KR | 10-2012-0005884 A | 1/2012 |
| KR | 1020120003423 A | 1/2012 |
| KR | 1020120075685 A | 7/2012 |
| KR | 1020120101586 A | 9/2012 |
| KR | 1020130006757 A | 1/2013 |
| KR | 1020130062611 A | 6/2013 |
| KR | 1020130123696 A | 11/2013 |
| KR | 1020130131749 A | 12/2013 |
| KR | 1020140029729 A | 3/2014 |

* cited by examiner

DISPLAY APPARATUS FOR INDIVIDUALLY CONTROLLING TRANSPARENCY AND RENDERING STATE OF EACH OF A PLURALITY OF AREAS AND DISPLAY METHOD THEREOF

CROSS-REFERENCE TO RELATED APPLICATION

This application is a Continuation application of U.S. application Ser. No. 14/744,224, filed on Jun. 19, 2015 which claims priority from a Korean patent application No. 10-2014-0141659, filed on Oct. 20, 2014 in the Korean Intellectual Property Office, the entire disclosure of which is hereby incorporated by reference.

TECHNICAL FIELD

Apparatuses and methods consistent with exemplary embodiments relate to a display apparatus which is bendable and transparent and a display method thereof.

BACKGROUND

With the development of electronic technologies, various kinds of display apparatuses have been developed. In particular, display apparatuses such as television (TVs), personal computers (PCs), laptops, tablet PCs, mobile phones, and MP3 players are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus refers to a display apparatus which is flexible in nature and can be curved, bent, and/or folded into different shapes like paper.

The shape of display apparatus can be changed by a force that is applied by a user and thus may be used for various purposes. For instance, the flexible display apparatus may be used for mobile apparatuses such as mobile phones, tablet PCs, electronic albums, personal digital assistants (PDAs), and MP3 players.

A transparent display apparatus has flexibility and transparency unlike existing display apparatuses. Therefore, there is a need for a method for using corresponding characteristics for the operations of a display apparatus in various ways.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display apparatus, which can adjust transparency, a rendering state, and a touch activation state of each area which is divided by a folding state to be suitable to the folding state, and provide a screen optimized to the folding state, and a display method thereof.

According to an aspect of an exemplary embodiment, there is provided a display apparatus including: a display that has an adjustable transparency; a sensor configured to detect bending of the display; and a controller configured to recognize the display as being divided into a plurality of areas based on the detected bending, and individually control the transparency and a rendering state of each of the plurality of areas.

In response to folding on at least part of the display being detected, the controller is further configured to recognize the display as being divided into a first display area in which an exposure state is maintained, a second display area which changes to a non-exposure state, and a third display area which covers the second display area according to the folding, and individually control a transparency and a rendering state of each of the first, second, and third display areas.

The controller is further configured to maintain the transparency of the first display area and adjust the rendering state of the first display area to fit a screen size of the first display area, adjust the transparency of the third display area and adjust the rendering state of the third display area to fit a screen size of the third display area, and change the transparency of the second display area to an opaque state.

In response to entering a personalization mode according to the detected bending, the controller is further configured to provide at least one of a content control menu and a transparency adjustment menu to a user grip area of the display.

The display apparatus may further include a gaze recognizer configured to recognize a user gaze direction, and wherein, in response to the display being bent in the user gaze direction, the controller is further configured to determine that the display apparatus enters the personalization mode and adjust a transparency of a surface panel of the display, which is in a direction opposite to a direction of the bending, to an opaque state.

The display includes a flexible display panel having an adjustable transparency, a first touch panel provided on one surface of the flexible display panel, and a second touch panel provided on another surface of the flexible display panel, and wherein the controller is further configured to individually control a touch activation state of the first and second touch panels corresponding to each of the plurality of areas.

In response to folding on at least part of the display being detected, the controller is further configured to recognize the flexible display panel as being divided into a first display area in which an exposure state is maintained, a second display area which changes to a non-exposure state, and a third display area which covers the second display area according to the folding, and individually control the touch activation state of the first and second touch panels corresponding to each of the plurality of areas.

The controller is further configured to display a synchronization pattern on the second display area and display at least part of the synchronization pattern on the third display area, and synchronize coordinates between the second display area and the third display area based on a user manipulation on the at least part of the synchronization pattern displayed on the third display area.

In response to a touch interaction being inputted through the third display area, the controller is further configured to determine a location of the second display area corresponding to the touch interaction based on coordinates information matched according to the synchronization of the coordinates.

The display apparatus further includes a communicator configured to communicate with another display apparatus, and wherein the controller is configured to transmit a synchronization pattern to the another display apparatus in response to the display being in contact with the another display apparatus, provide a user interface including at least part of the synchronization pattern in response the synchronization pattern being displayed on the another display apparatus, and synchronize coordinates between the display apparatus and the another display apparatus based on a user manipulation on the at least part of the synchronization pattern.

According to another aspect of an exemplary embodiment, there is provided a method for controlling of a display apparatus including: detecting bending of a display included in the display apparatus; recognizing the display as being divided into a plurality of areas based on the detected bending; and individually controlling a transparency and a rendering state of each of the plurality of areas.

The individually controlling comprises, in response to folding on at least part of the display being detected, recognizing the display as being divided into a first display area in which an exposure state is maintained, a second display area which changes to a non-exposure state, and a third display area which covers the second display area according to the folding, and individually controlling a transparency and a rendering state of each of the first, second, and third display areas.

The individually controlling comprises maintaining the transparency of the first display area and adjusting the rendering state of the first display area to fit a screen size of the first display area, adjusting the transparency of the third display area and adjusting the rendering state of the third display area to fit a screen size of the third display area, and changing the transparency of the second display area to an opaque state.

The method may further include, in response to entering a personalization mode according to the detected bending, displaying at least one of a content control menu and a transparency adjustment menu to a user grip area of the display.

The method may further include: recognizing a user gaze direction, and in response to the display being bent in the user gaze direction, determining that the display apparatus enters the personalization mode and adjusting a surface panel of the display, which is in a direction opposite to a direction of the bending direction, to an opaque state.

The display may include a flexible display panel having an adjustable transparency, a first touch panel provided on one surface of the flexible display panel, and a second touch panel provided on another surface of the flexible display panel, and wherein the method further comprises individually controlling a touch activation state of the first and second touch panels corresponding to each of the plurality of areas.

The individually controlling the touch activation state includes, in response to folding on at least part of the display being detected, recognizing the display as being divided into a first display area in which an exposure state is maintained, a second display area which changes to a non-exposure state, and a third display area which covers the second display area according to the folding, and individually controlling the touch activation state of the first and second touch panels corresponding to each of the plurality of areas.

The method may further include: displaying a synchronization pattern on the second display area and displaying at least part of the synchronization pattern on the third display area, and synchronizing coordinates between the second display area and the third display area based on a user manipulation on the at least part of the synchronization pattern displayed on the third display area.

The synchronizing the coordinates comprises, in response to a touch interaction being inputted through the third display area, determining a location of the second display area corresponding to the touch interaction based on coordinates information matched according to the synchronization of the coordinates.

The method may further include: transmitting a synchronization pattern to another display apparatus in response to the display being in contact with a display of the another display apparatus; and providing a user interface including at least part of the synchronization pattern, and synchronizing coordinates between the display apparatus and the another display apparatus based on a user manipulation on the at least part of the synchronization pattern, in response to the synchronization pattern being displayed on the another display apparatus.

According to another aspect of an exemplary embodiment, there is provided a display apparatus including: a flexible display that includes a front display surface and a back display surface and is foldable to have a plurality of display areas and; a sensor configured to determine a folding state of each of the plurality of display areas and a position of a user in relation to each of the plurality of display areas, the folding state including a unfolded state, an exposed folded state, and an unexposed folded state; and a controller configured to recognize a size of each of the plurality of areas, adjust a transparency level of each of the plurality of display areas based on the folding state and the position of the user, and control a rendering state of each of the plurality of display areas based on the recognized size.

The folding state is determined as the exposed folded state when a corresponding one of the plurality of display areas is folded and exposed to the outside of the flexible display, and the folding state is determined as the unexposed folded state when the corresponding display area is folded to be hidden from the outside of the flexible display.

The controller is configured to adjust a transparency level of a corresponding one of the plurality of display areas to be opaque in response to the sensor determining that the corresponding display area is in the exposed folded state and the user is positioned in a direction opposite to the corresponding display area.

According to various exemplary embodiments described above, a flexible and transparent display apparatus can be utilized in various ways.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
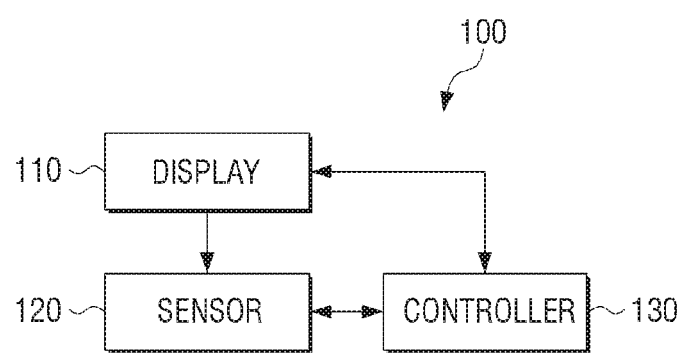
FIG. 1 is a block diagram illustrating a configuration of a display apparatus according to an exemplary embodiment.

Hereinafter, exemplary embodiments will be described in greater detail with reference to the accompanying drawings.

In the following description, like reference numerals are used for like elements, even in different drawings. The matters defined in the description, such as detailed construction and elements, are provided to assist in a comprehensive understanding of exemplary embodiments. However, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a display apparatus according to an exemplary embodiment. Referring to FIG. 1, the display apparatus 100 includes a display 110, a sensor 120, and a controller 130.

The display 110 displays a screen. The display apparatus 100 including the display 110 may be implemented by using a display apparatus which is bendable and has transparency. The display 110 will be explained below in detail.

The sensor 120 may detect bending of the display 110. Specifically, the sensor 120 may recognize various bending characteristics such as, for example, a bending/folding location, a bending/folding direction, a bending/folding angle, an intensity of bending/folding, a bending/folding speed, the number of times of bending/folding operations, a bending/folding occurrence time, a bending/folding holding time, and the like, using a touch sensor, a bend sensor, a pressure sensor, and the like.

The controller 130 determines a viewable area from among the display areas divided based on the bending characteristics detected by the sensor 120, and controls transparency and a rendering state of the display area according to the result of the determining. In this case, the controller 130 may detect a bending line based on a change in distribution of resistance values output from the bend sensor of the sensor 120 or distribution of pressure detected by the pressure sensor. The bending line recited herein may refer to a line connecting points at which the degree of bending has the greatest value in the area where bending occurs. For example, a virtual line connecting bending points (or bending coordinates) at which a maximum resistance value is output from the bend sensor may be detected as the bending line. In addition, when the bend sensor is implemented by using sensors (for example, strain gauge) individually located at a plurality of points, the bending points may be the points where the respective sensors are located, and a virtual line connecting the sensors outputting the maximum resistance value may be the bending line. In some cases, the controller 130 may determine the bending state of the display 110 when at least one of the following conditions is met: a touch is recognized at two points distanced from each other by a predetermined distance; a pressure of a touch is recognized as being greater than a predetermined level; a pressing state is held for a predetermined time.

In particular, the controller 130 may divide the display 110 into a plurality of areas based on the bending characteristics detected by the sensor 120, and control the transparency and the rendering state of each area differently. In other words, the controller 130 may recognize the display 110 as a plurality of areas divided based on the detected bending characteristics such as, the bending location, direction, angle, intensity, speed, and the like, and then adjust transparency and/or rendering state of each of the plurality of areas individually.

For example, in response to folding on a certain area of the display 110 being detected, the controller 130 may divide the display 110 into a first display area where an exposure state is maintained, a second display area which changes to a non-exposure state, and a third display area which covers the second display area according to the folding, and may differently control transparency and a rendering state of each display area.

In this case, with respect to the first display area, the controller 130 may maintain the transparency and adjust the rendering state to fit the screen size of the first display area. With respect to the third display area, the controller 130 may adjust the transparency, the rendering state, and/or the resolution of the third display area to fit the screen size of the third display area. The controller 130 may change the second display area to an opaque state.

Specifically, the controller 130 may rescale an image to fit the screen size using vector graphic technology, and display the image. That is, in a graphic user interface (GUI) of the vector method, an image is not damaged even when the image size is changed. Therefore, the controller 130 may rescale the image and display information optimized to the size of a corresponding area.

In addition, in response to text-based information, the controller 130 may optimize the information to fit the size of a corresponding area by adjusting text lines and the number of texts included in a single line. In addition, the controller 130 may change a text size to fit the size of the corresponding area, and, for example, may change the text size between a maximum size and a minimum size.

In addition, the controller 130 may rearrange and display contents corresponding to each area by considering the shape and location of each area, the direction of the bending line, and the like.

In addition, the controller 130 may convert the corresponding contents to fit various layouts by considering the inclination angle of the display apparatus 100, as well as the shape of each area, and display the contents. For example, when a bending area is activated, a shade may be generated by an angle of view and thus the brightness of the display may be automatically adjusted by considering the bending angle.

In addition, the controller 130 may convert the corresponding contents to fit various layouts by considering a radius of curvature (R) generated by the bending, and display the contents. For example, since the shape of a layout suitable to a user's view field considering content legibility may vary according to the radius of curvature (R), an appropriate layout may be provided by considering the inclination angle.

In addition, in response to the display apparatus 100 entering a personalization mode according to the detected bending, the controller 130 may provide at least one of a content control menu and a transparency adjustment menu on a user grip area and a periphery area of the grip area. The content control menu refers to a menu which interworks with a mouse, a keypad, or the like, and the transparency adjustment menu refers to a GUI menu for guiding transparency adjustment. However, this should not be considered as limiting and a GUI menu for guiding color adjustment may be provided in the grip area and the periphery area of the grip area.

According to an exemplary embodiment, the controller 130 may determine the first display area as an activation area and display the screen, and determine the folded area, that is, the second display area and the third display area as inactivation areas and convert into a screen standby state. The screen standby state may be a screen off state, a screen lock state, a security screen state, and the like. The screen off state refers to a state in which the screen is turned off and unable to receive inputs through the screen. The screen lock state refers to a state in which the screen is turned on but other functions are disabled unless a designated input is performed. The security screen state refers to a state in which a user should perform a designated input to convert into a screen activation state. For example, if the display 110 is an Organic Light Emitting Diode (OLED) display including a light emitting element assigned to each pixel, a turning on and off (ON/OFF) operation is performed on a pixel basis. When power is not supplied to the light emitting elements of the OLED display, the screen is displayed in black and thus the screen inactivation area may be displayed in black. If the display 110 is implemented with a Liquid Crystal Display (LCD), a backlight unit of a grid method is adopted such that the backlight unit is turned on/off on a grid basis to process a screen inactivation area. However, the backlight unit may be turned on/off for each area in various ways.

In addition, according to an exemplary embodiment, the controller 130 may convert the inactivation area into a turn off state. The turn off state is a state in which power is turned off and all the input and output are stopped.

In the above-described example, the inactivation state refers to one of the turn off state, the screen off state, the screen lock state, and the security screen state. However, this is merely an example and at least two states may be implemented simultaneously. For example, in the inactivation state, the screen off state and the security screen state may be applied simultaneously.

In addition, in response to multi-bending, the controller 130 may display screens corresponding to a plurality of areas divided according to the multi-bending.

In addition, in response to the bending area returning to a flat state, the controller 130 may convert into the standby state.

Figure 2A:
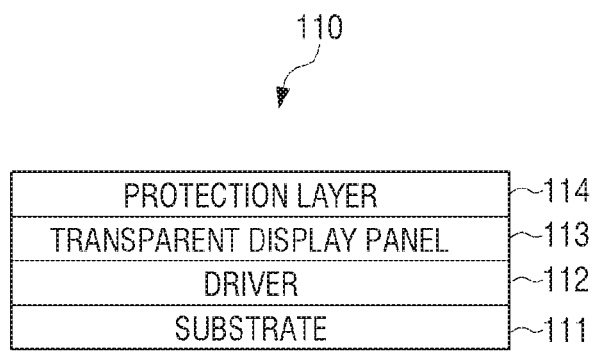
FIGS. 2A and 2B illustrate a basic configuration of a display of a display apparatus according to an exemplary embodiment.

FIG. 2A illustrates a basic configuration of the display 110 of FIG. 1 according to an exemplary embodiment. Referring to FIG. 2A, the display 110 includes a substrate 111, a driver 112, a display panel 113, and a protection layer 114.

The display apparatus 100 may be an apparatus that can be bent, curved, crooked, folded or rolled like paper, while having display characteristics of a flat panel display apparatus.

Specifically, the substrate 111 may be implemented by using a plastic substrate (for example, a polymer film) which is deformable by an external pressure.

The plastic substrate has a structure which is formed by barrier coating opposite surfaces of a base film. The base film may be implemented by using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film. An organic membrane or an inorganic membrane may be used for the purpose of maintaining flexibility.

The substrate 111 may also be formed of a flexible material such as thin glass or metal foil in addition to the plastic substrate.

The driver 112 drives the display panel 113. Specifically, the driver 112 applies a driving voltage to a plurality of pixels which constitute the display panel 113, and may be implemented by using amorphous silicon (a-si) thin film transistor (TFT), a low temperature poly silicon (LTPS) TFT, or an organic TFT (OTFT) and so on. The driver 112 may also be implemented in various forms according to the form of the display panel 113. For instance, the display panel 113 may consist of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented by using an electroluminescent display (EL), an electrophoretic display (EPD), an electrochromic display (ECD), an LCD, an active matrix LCD (AMLCD), and a plasma display panel (PDP), in addition to an OLED. If the display panel 113 is embodied by the LCD, it cannot emit light by itself and thus may require a separate backlight unit. If the LCD does not use backlight, it may use ambient light. In order to use the LCD display panel 113 without the backlight unit, an environment such as an outdoor environment, with plenty of natural light, may be used to operate the LCD.

The protection layer 114 protects the display panel 113. For example, the protection layer 114 may be made of ZrO, CeO2, or ThO2. The protection layer 114 may be manufactured as a transparent film and may cover the entire surface of the display panel 113.

The display 110 may have a structure with adjustable transparency according to an exemplary embodiment. In this case, the substrate 111 may be implemented by using a polymer material such as plastic having transparency, the driver 112 may be implemented by using a transparent transistor, and the display panel 113 may be implemented by using a transparent organic light emitting layer and a transparent electrode and have transparency.

The transparent transistor refers to a transistor that is manufactured by substituting opaque silicon of an existing thin film transistor with a transparent material such as zinc oxide or titanium oxide. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials.

Unlike in FIG. 2A, the display 110 may also be implemented by using electronic paper (e-paper). The e-paper is a display that applies general ink characteristics to paper, and is different from a general flat panel display in that it uses reflected light. The electronic paper may change a picture or text using electrophoresis, which uses a twist ball or a capsule.

Figure 2B:
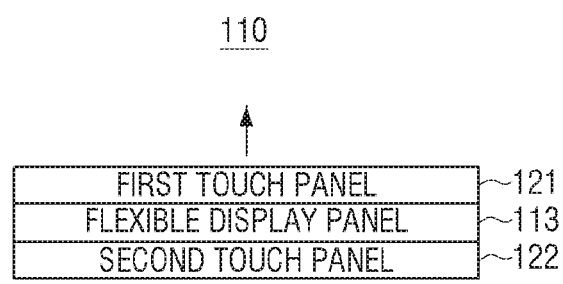

FIG. 2B illustrates a basic configuration of a display according to another exemplary embodiment. Referring to FIG. 2B, the display 110 includes a flexible display panel 113, a first touch panel 121 formed on one surface of the flexible display panel 110, and a second touch panel 122 formed on the other surface of the flexible display panel 110. In this case, the controller 130 may divide the display 110 into a plurality of areas based on detected bending and differently control a touch activation state of each of the plurality of areas.

In addition, in response to folding on a certain area of the display 110 being detected, the controller 130 may divide the display 110 into a first display area where an exposure state is maintained, a second display area which changes to a non-exposure state, and a third display area which covers the second display area according to the folding, and may differently control a touch activation state of a touch panel corresponding to each area.

In addition, the controller 130 may display a synchronization pattern on the second display area and display at least part of the synchronization pattern on the third display area, and may synchronize coordinates between the second display area and the third display area based on a user manipulation on at least part of the synchronization pattern displayed on the third display area.

In addition, in response to a touch interaction being inputted through the third display area, the controller 130 may determine the location of the second display area corresponding to the touch interaction based on coordinates information matched according to the coordinates synchronization.

Figure 3:
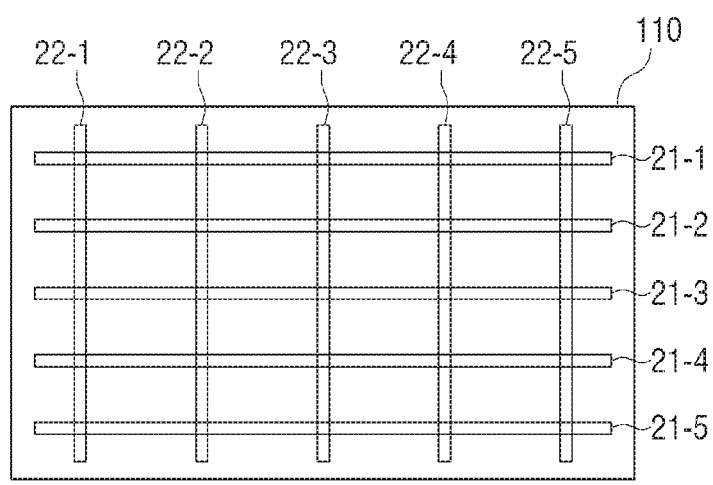
FIG. 3 illustrates a method for detecting bending of a flexible display apparatus according to an exemplary embodiment.

FIG. 3 illustrates a method for detecting bending according to an exemplary embodiment.

The display apparatus 100 is capable of being bent, curved, folded, and/or rolled when an external pressure or force is applied to the display apparatus 100. The term "bending" may include "normal bending", "folding," and "rolling". The normal bending means a state in which the display apparatus 100 is bent.

The folding refers to a state in which the display apparatus 100 is folded. The folding and the normal bending may be distinguished from each other by a degree of bending (e.g., deformation). For example, if bending is performed by more than a predetermined bending angle, the bending corresponds to a folding deformation, and, if bending is performed by less than the predetermined bending angle, the bending corresponds to normal bending.

The definitions of the various shape deformation examples described above are merely an example and shape deformation may be set differently according to the type, size, weight, and characteristic of the display apparatus. For example, if the display apparatus 100 can be bent to such an extent that the surfaces are in contact with each other, the state in which the surfaces of the display apparatus 100 are in contact with each other by bending may correspond to folding.

For the convenience of explanation, a normal bending state according to an exemplary embodiment may be referred to as a bending state.

The display apparatus 100 may detect bending in various ways.

For example, the sensor 120 may include a bend sensor which is arranged on one surface such as a front surface or a rear surface of the display 110, or a bend sensor which is arranged on opposite surfaces of the display 110. The controller 130 may detect bending using a value which is detected by the bend sensor of the sensor 120.

The bend sensor refers to a sensor that can be bent and has a resistance value which varies according to a degree of bending. The bend sensor may be implemented by using devices such as an optical fiber bend sensor, a pressure sensor, and a strain gauge.

The sensor 120 may detect a resistance value of the bend sensor using a level of a voltage applied to the bend sensor or an intensity of a current flowing in the bend sensor, and may detect a bending state in a location of the bend sensor according to the detected resistance value. As such, the sensor 120 may measure a repetitive bending, deflection, acceleration or range of motion and indicate the degree of a bending moment In FIG. 3, the bend sensor is embedded in the front surface of the display 110. However, this is merely an example and the bend sensor may be embedded in the rear surface of the display 110 or may be embedded in opposite surfaces. Also, the shape, number, and location of bend sensors may be changed variously. For example, the display 110 may include a single bend sensor or a plurality of bend sensors which are connected to one another. The single bend sensor may detect one bending data, but may include a plurality of sensing channels to detect a plurality of bending data.

FIG. 3 illustrates an example of a plurality of bar-shaped bend sensors which are arranged in a vertical direction and a horizontal direction in a grid pattern.

Referring to FIG. 3, the bend sensor of the display apparatus 100 includes bend sensors 21-1 to 21-5 which are arranged in a first direction, and bend sensors 22-1 to 22-5 which are arranged in a second direction which is perpendicular to the first direction. The bend sensors 21-1 to 21-5 and 22-1 to 22-5 are arranged to be apart from one another by a predetermined distance.

In FIG. 3, ten bend sensors 21-1 to 21-5 and 22-1 to 22-5 are arranged in each of the horizontal direction and the vertical direction in a grid formation. However, this is merely an example and the number of bend sensors may be changed according to the size of the display apparatus 100. The bend sensors are arranged in the horizontal direction and the vertical direction to detect bending from the entire area of the display apparatus. Therefore, if only a part of the display apparatus is flexible or if the display apparatus needs to detect bending from only a part of the apparatus, the bend sensor may be arranged in only a corresponding portion of the apparatus. Each of the bend sensors 21-1 to 21-5 and 22-1 to 22-5 may be implemented by using an electric resistance sensor which uses an electric resistance, or a micro optical fiber sensor which uses a strain rate of an optical fiber.

Figure 4A:
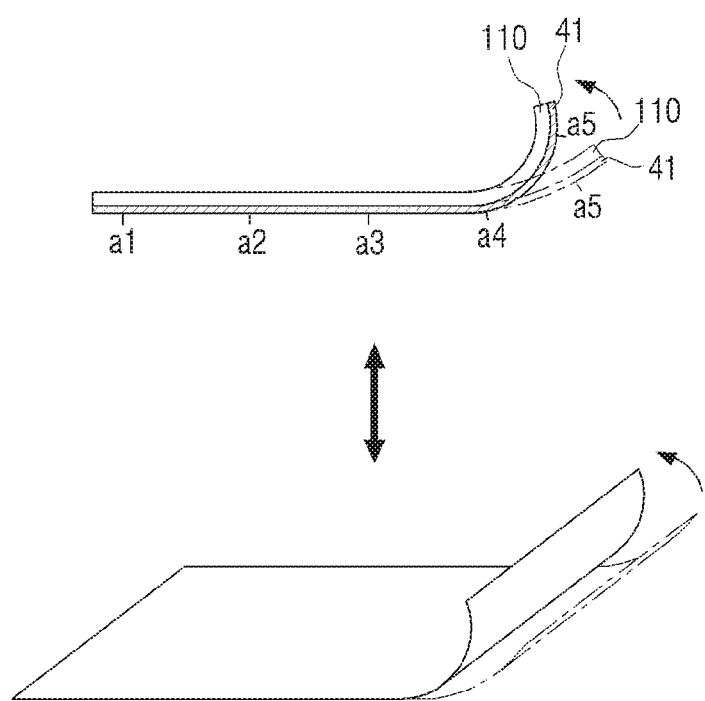
FIGS. 4A to 4C and FIGS. 5A to 5C illustrate a method for determining a degree of bending according to an exemplary embodiment.
Figure 4B:
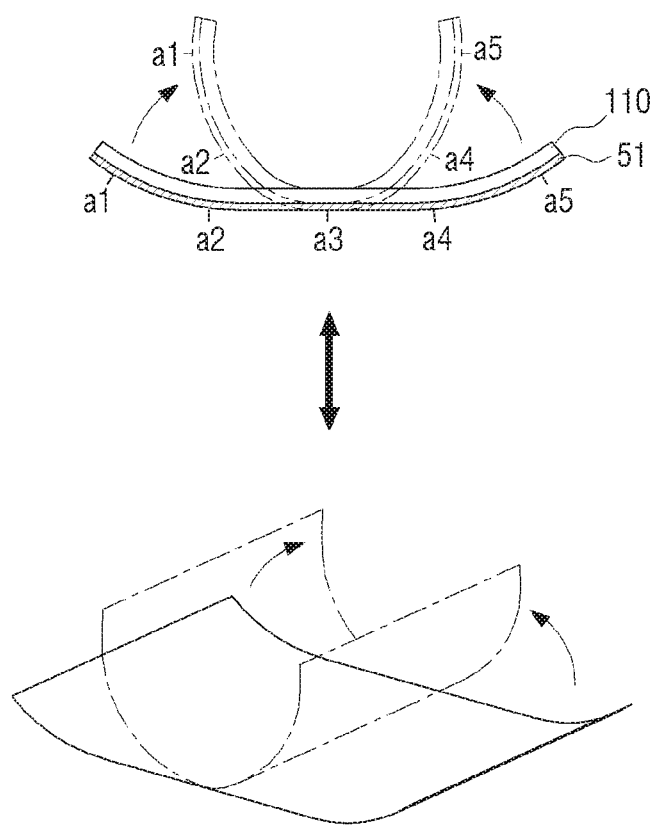
Figure 4C:
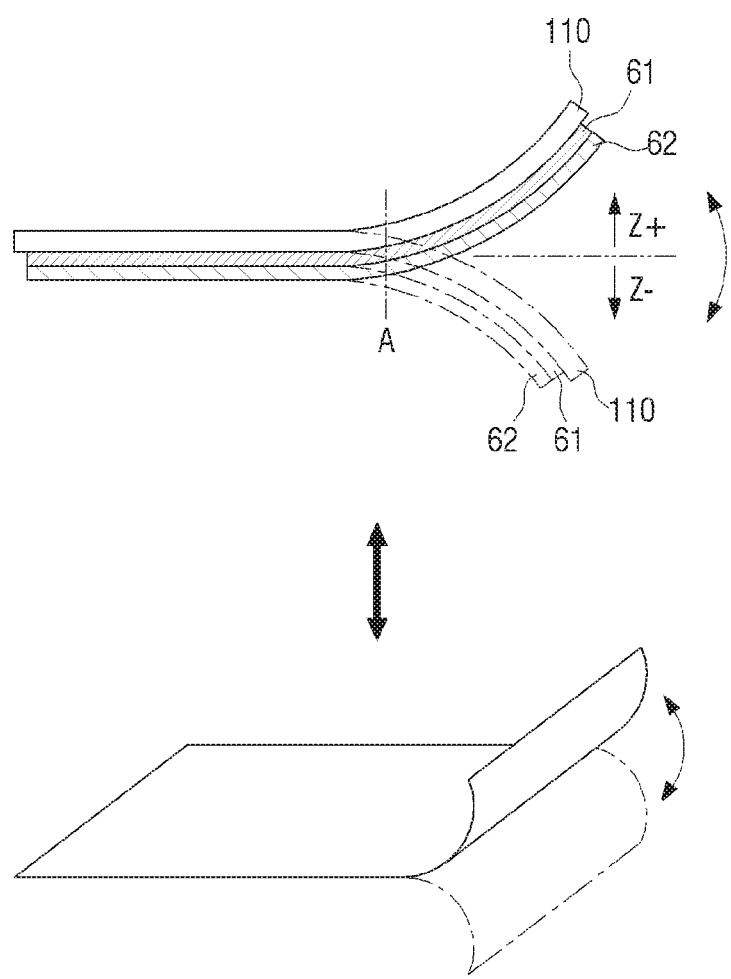

FIGS. 4A to 4C illustrate a method for determining a degree of bending according to an exemplary embodiment.

Referring to FIG. 4A, the display apparatus 100 determines a degree of bending of the display apparatus 100 using a change in the resistance value output from the bend sensor at a predetermined interval.

Specifically, the controller 130 calculates a difference between a resistance value of a point where the maximum resistance value of a bend sensor is output and a resistance value output at a point which is disposed away from the point of the maximum resistance value by a predetermined distance.

The controller 130 determines the degree of bending using the calculated difference in the resistance value. Specifically, the display apparatus 100 divides the degree of bending into a plurality of levels, matches each level with a resistance value of a predetermined range, and stores the matched values.

Accordingly, the display apparatus 100 determines the degree of bending according to which level of the plurality of levels corresponds to the calculated resistance value difference.

For instance, as shown in FIG. 4A, the degree of bending is determined based on a difference between a resistance value output at a point a5 where a bend sensor 41 disposed on the rear surface of the display apparatus 100 outputs the greatest resistance value, and a resistance value output at a point a4 which is disposed away from the point a5 by a predetermined distance.

Specifically, a level corresponding to the resistance value difference, which is calculated in the exemplary embodiment of FIG. 4A, is identified from among the plurality of pre-stored levels, and the degree of bending is determined based on the identified level. The degree of bending may be represented by a bending angle or an intensity of bending.

When the degree of bending increases as shown in FIG. 4A, the difference between the resistance value output at the point a5 and the resistance value output at the point a4 increases in comparison with the existing resistance value difference. Accordingly, the controller 130 may determine that the degree of bending increases.

The display apparatus 100 may be bent in different directions, a Z+ direction or a Z− direction.

As shown in FIG. 4B, the degree of bending may be determined using a change in the bending radius R. Since the bending radius R can be determined using a difference in the resistance values of the bend sensors as shown in FIG. 4A, a detailed description thereof will be omitted.

A layout for a screen activation area may vary according to the bending radius R described above.

The bending direction may be detected in various ways. For instance, two bend sensors may be disposed one on the other and the bending direction may be determined based on a difference of change in the resistance value of each bend sensor. A method for detecting a bending direction using overlapping bend sensors will be explained with reference to FIG. 4C.

Referring to FIG. 4C, two bend sensors 61 and 62 may be disposed overlapping each other on one side of the display 110. In this case, when bending is performed in one direction, different resistance values are output from the upper bend sensor 61 and the lower bend sensor 62 at a point where the bending is performed. Accordingly, the bending direction may be determined by comparing the resistance values of the two bend sensors 61 and 62 at the same point.

Specifically, when the display apparatus 100 is bent in the Z+ direction as shown in FIG. 4C, tension exerted to the lower bend sensor 62 is greater than that of the upper bend sensor 61 at a point 'A' corresponding to a bending line. On the other hand, when the display apparatus 100 is bent toward the rear surface, tension exerted to the upper bend sensor 61 is greater than that of the lower bend sensor 62.

Accordingly, the controller 130 detects the bending direction by comparing the resistance values of the two bend sensors 61 and 62 at the point A.

Although the two bend sensors are disposed overlapping each other on one side of the display 110 in FIG. 4C, the bend sensors may be disposed on opposite surfaces of the display 110.

Although the bending direction is detected using the two bend sensors in the above-described exemplary embodiment, the bending direction may be detected by means of only a strain gauge disposed on one surface of the display 110. That is, since a compressive force or tension is exerted to the strain gauge disposed on one surface according to a bending direction, the bending direction can be determined by identifying a characteristic of the output value.

Figure 5A:
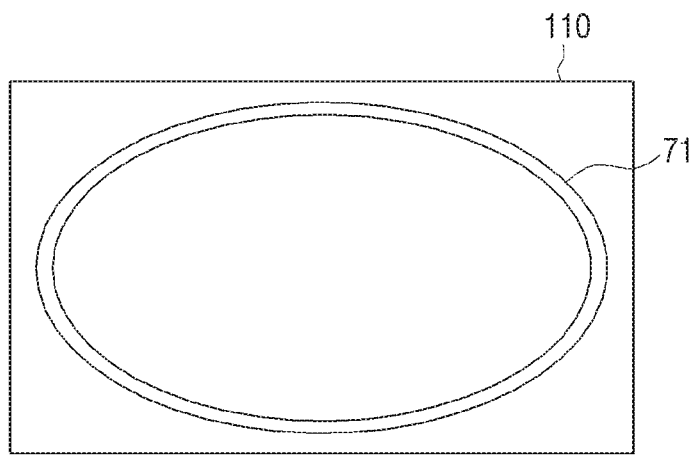

FIG. 5A is a view illustrating an example of a single bend sensor which is disposed on one surface of the display 110 to detect bending. Referring to FIG. 5A, a bend sensor 71 may be implemented in a form of a looped curve forming a circle, a quadrangle, or other polygons, and may be disposed along an edge of the display 110. The controller 130 may determine a point at which a change in an output value of the looped curve is detected to be a bending area. The bend sensor may be connected to the display 110 in a form of an open curve such as an S shape, a Z shape, or a zigzag shape.

Figure 5B:
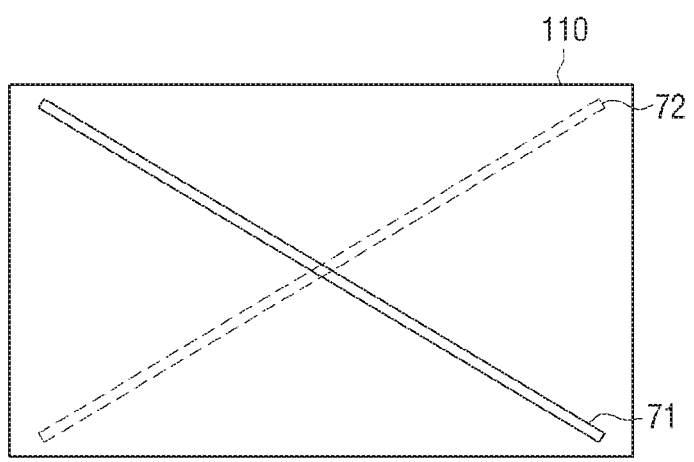

FIG. 5B is a view illustrating two bend sensors which intersect. Referring to FIG. 5B, a first bend sensor 71 is disposed on a first surface of the display 110 and a second bend sensor 72 is disposed on a second surface of the display 110. The first bend sensor 71 is disposed on the first surface of the display 110 in a first diagonal direction, and the second bend sensor 72 is disposed on the second surface in a second diagonal direction. Accordingly, output values and output points of the first and second bend sensors 71 and 72 are changed according to various bending conditions such as a case in which each corner is bent, a case in which each edge is bent, a case in which a center is bent, and a case in which folding or rolling is performed. Accordingly, the controller 130 may determine which type of bending is performed according to a characteristic of the output value.

Although line type bend sensors are used in the above-described various exemplary embodiments, bending may be detected using a plurality of separate strain gauges.

Figure 5C:
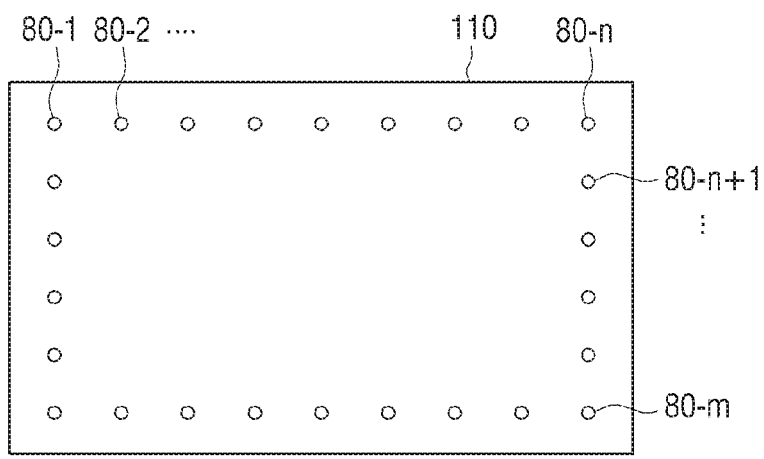

FIG. 5C is a view to illustrate a method for detecting bending using a plurality of strain gauges. The strain gauge uses metal or a semiconductor in which a resistance is greatly changed according to an applied force, and detects deformation of a surface of an object to be measured according to a change in the resistance value. It is common that a material such as metal increases a resistance value when its length is stretched by an external force, and decreases the resistance value when the length is contracted. Accordingly, it is determined whether bending is performed or not by detecting a change in the resistance value.

Referring to FIG. 5C, a plurality of strain gauges are arranged along an edge of the display 110. The number of strain gauges may be changed according to the size and shape of the display 110, or a predetermined bending sensing resolution, etc.

In the state in which the strain gauges are arranged as shown in FIG. 5C, a user may bend a certain point in an arbitrary direction. Specifically, when a certain corner is bent, a force is exerted to a strain gauge overlapped with a bending line from among strain gauges 80-1 to 80-$n$ which are arranged in the horizontal direction. Accordingly, an output value of the corresponding strain gauge increases in comparison with output values of the other strain gauges.

Also, a force is exerted to a strain gauge overlapped with the bending line from among strain gauges 80-$n$, 80-$n$+1 to 80-$m$ which are arranged in the vertical direction, and thus an output value is changed. The controller 130 may determine that a line connecting the two strain gauges in which the output values are changed is a bending line.

Also, in addition to the exemplary embodiments of FIGS. 5A to 5C, the display apparatus 100 may detect the bending direction using various sensors such as a gyro sensor, a geomagnetic sensor, and an acceleration sensor, etc. However, a detailed description thereof will be omitted.

As described above, the display apparatus 100 may detect bending using various kinds of sensors. The configuration of the sensor and the detecting method described above may be applied to the display apparatus 100 individually or may be applied in combination.

The sensor 120 may detect a user's touch manipulation on a screen of the display 110 in addition to detecting the bending.

Specifically, the sensor 120 may detect a touch using capacitive overlay, resistive overlay, infrared beam, surface acoustic wave, integral strain gauge, piezo electric.

For instance, the sensor 120 may include a transparent conductive oxide film such as an indium-tin oxide (ITO) deposited on the substrate 111 of the display 110, and a film formed on the upper portion of the transparent conductive oxide film. Accordingly, when the user touches the screen, upper and lower plates at the touched point are brought into contact with each other and an electric signal is transmitted to the controller 130. The controller 130 recognizes the touched point using coordinates of an electrode to which the electric signal is transmitted. The method for detecting a touch is disclosed in various prior art documents and thus a detailed description thereof will be omitted.

In response to bending being detected in a screen inactivation state, the controller 130 may activate the bending area divided by the bending line. In response to bending being detected in a screen activation state, the controller 130 may inactivate the bending area divided by the bending line. Since the detailed functions of the controller 130 have been described, a detailed description thereof will be omitted.

Figure 6:
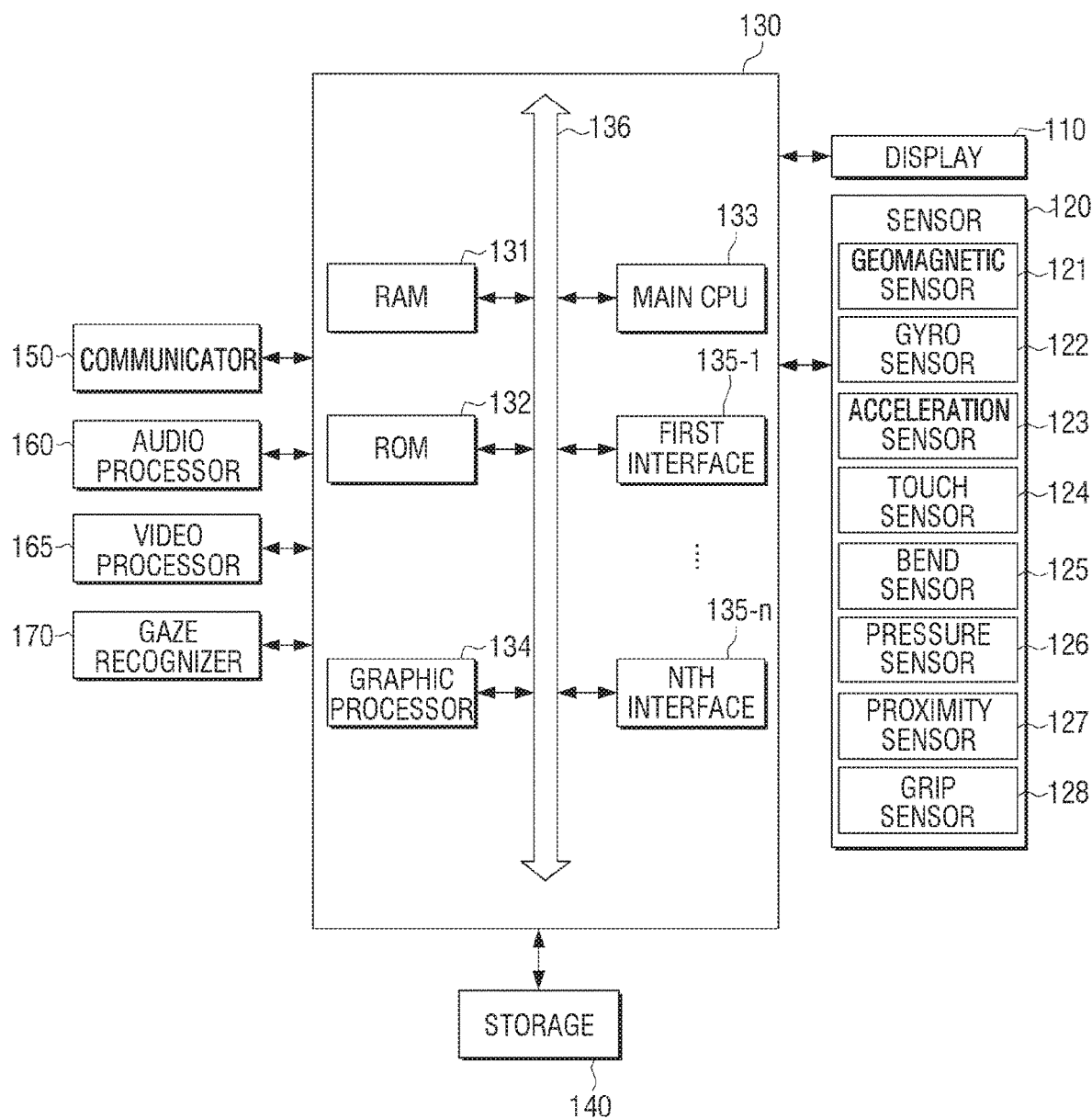
FIG. 6 is a block diagram to illustrate an example of a detailed configuration of a display apparatus to explain an operation according to an exemplary embodiment.

FIG. 6 is a block diagram to illustrate an example of a detailed configuration of a display apparatus to explain an operation according to various exemplary embodiments.

Referring to FIG. 6, the display apparatus 100 includes a display 110, a sensor 120, a controller 130, a storage 140, a communicator 150, an audio processor 160, a video processor 165, and a gaze recognizer 170.

The display 110 may be transparent and flexible. The detailed configuration and operation of the display 110 has been described above and thus a redundant explanation is omitted.

The storage 140 may store various programs or data associated with the operation of the display apparatus 100, setting information set by the user, system operating software, various application programs, and the like.

The sensor 120 detects a user manipulation occurring in the display apparatus 100 including the display 110, in particular, a bending manipulation or a touch manipulation. Referring to FIG. 6, the sensor 120 may include various kinds of sensors such as a touch sensor 121, a geomagnetic sensor 122, an acceleration sensor 123, a bend sensor 124, a pressure sensor 125, a proximity sensor 126, and a grip sensor 127, etc.

The touch sensor 121 may be implemented by using a capacitive type or a resistive type of sensor. The capacitive type calculates touch coordinates by sensing minute electricity excited in a user's body when a part of the user's body touches the surface of the display 110, using a dielectric substance coated on the surface of the display 110. The resistive type sensor includes two electrode plates embedded in the display apparatus 100, and, when a user touches a screen, calculates touch coordinates by sensing an electric current flowing due to contact between upper and lower plates at the touched point. In addition, infrared beam, surface acoustic wave, integral strain gauge, and piezo electric may be used to detect a touch manipulation.

The geomagnetic sensor 122 senses a rotation state and a moving direction of the display apparatus 100. The acceleration sensor 123 senses a degree of tilt of the display apparatus 100. The geomagnetic sensor 122 and the acceleration sensor 123 may be used to sense bending characteristics such as a bending direction or a bending area of the display apparatus 100 as described above. However, the geomagnetic sensor 122 and the acceleration sensor 123 may be used to sense a rotation state or a tilt state of the display apparatus 100.

The bend sensor 124 may be embodied in various shapes and numbers as described above, and may sense a bending state of the display apparatus 100. The configuration and operation of the bend sensor 125 has been described above and thus a redundant explanation is omitted.

The pressure sensor 125 senses a magnitude of pressure exerted to the display apparatus 100 when the user performs a touch or bending manipulation. The proximity sensor 126 senses a motion which approaches without directly contacting the display surface.

The grip sensor 127 is disposed on a border or a handle of the display apparatus 100 separately from the pressure sensor 125, and senses a user's grip. The grip sensor 127 may be implemented by using a pressure sensor or a touch sensor.

The controller 130 may analyze various sensing signals sensed by the sensor 120, and, in response to determining that a folding manipulation is performed, may recognize the screen with a plurality of divided areas with reference to a folding line and perform a control operation corresponding to each of the divided areas.

In this case, the controller 130 controls the overall operation of the display apparatus 100 using various programs stored in the storage 140.

As shown in FIG. 6, the controller 130 includes a random access memory (RAM) 131, a read only memory (ROM) 132, a main central processing unit (CPU) 133, a graphic processor 134, first to nth interfaces 135-1~135-$n$, and a bus 136. The RAM 131, the ROM 132, the main CPU 133, the graphic processor 134, and the first to the nth interfaces 135-1~135-$n$ may be connected to one another through the bus 136.

The ROM 132 stores a set of commands to boot the system. When a turn on command is input and power is supplied, the main CPU 133 copies the operating system (OS) stored in the storage 140 into the RAM 131 according to a command stored in the ROM 132, executes the OS and boots the system. When the booting is completed, the main CPU 133 copies the various applications stored in the storage 140 into the RAM 131, executes the applications copied into the RAM 131, and performs various operations.

The graphic processor 134 generates a screen including various objects such as an icon, an image, a text, and the like using a calculator and a renderer. The calculator calculates attribute values such as a coordinate value, a shape, a size, and color of each object to be displayed according to a layout of a screen using a control command received through one of the first to nth interfaces 135-1-135-n. The renderer generates screens of various layouts including objects based on the attribute values calculated by the calculator. The screen generated by the renderer is displayed in the display area of the display 110.

The main CPU 133 accesses the storage 140 and performs booting using the OS stored in the storage 140. The main CPU 133 performs various operations using the various programs, contents, and data stored in the storage 140.

The first to the nth interfaces 135-1~135-n are connected to the above-described various elements. One of these interfaces may be a network interface which is connected to an external apparatus through a network.

The communicator 150 communicates with various types of external apparatuses. Specifically, the communicator 150 may communicate in various communication methods such as Wi-Fi, Bluetooth, Near Field Communication (NFC), Infrared Data Association (IrDa).

The audio processor 160 is an element that processes audio data. The audio processor 160 performs various processing operations such as decoding, amplifying, and noise filtering with respect to audio data.

The video processor 165 is an element that processes video data received at an image receiver. The video processor 165 may perform various image processing operations such as decoding, scaling, noise filtering, frame rate conversion, and resolution conversion with respect to the video data.

The gaze recognizer 170 is configured to recognize a user's gaze, and track a user's location, specifically, a user's face location and provide corresponding information to the controller 130. To achieve this, the gaze recognizer 170 may include a photographer and a detector.

The photographer is disposed on an outer area of the display apparatus 100 and photographs a user. For example, the photographer may be disposed on an upper center, left center, or right center bezel area of the display apparatus 100, but is not limited to these.

The photographer includes a lens module including a lens for photographing, and an image sensor. A shape inputted through the lens is inputted to the image sensor serving as a film as an optical signal, and the image sensor converts the inputted optical signal into an electric signal and transmits the electric signal to the detector.

The detector detects a user's face location from the user image received from the photographer, and tracks the user's face location. Specifically, the detector may track a user's movement location based on the location of the user's face area detected from a previous frame and a current frame, and provide corresponding information to the controller 130.

Figure 7A:
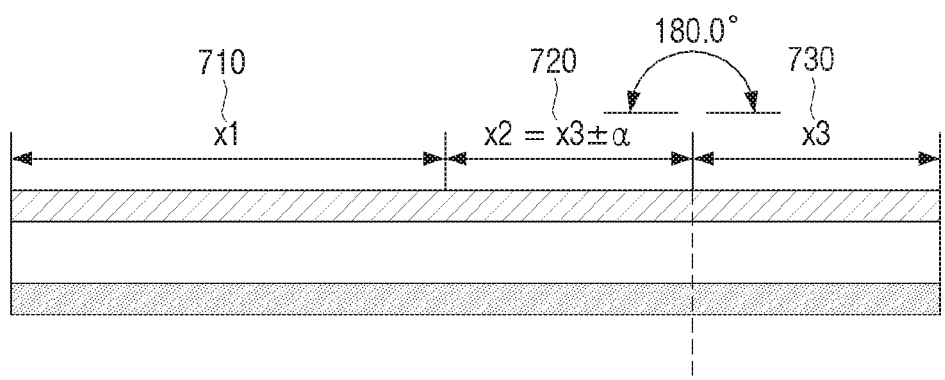
FIGS. 7A and 7B illustrate a method for dividing an area according to a folding manipulation according to an exemplary embodiment.
Figure 7B:
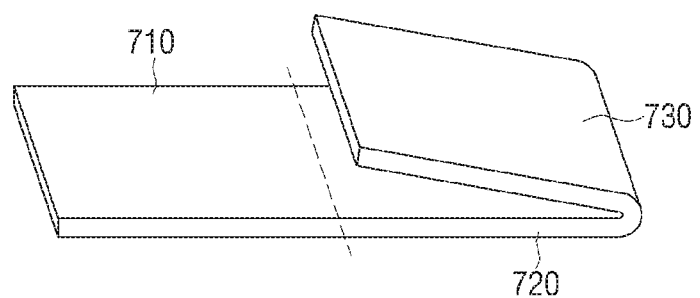

FIGS. 7A and 7B illustrate a method for dividing a display according to a folding manipulation according to an exemplary embodiment.

In response to a folding and holding manipulation being performed on an area of the display 110 where bending is performed as shown in FIG. 7A, the controller 130 may divide the display 110 into a plurality of areas based on a folding line.

As shown in FIG. 7A, the display 110 may be divided into a first display area 710 in which an exposure state is maintained, a second display area 720 which changes to a non-exposure state, and a third display area 730 which covers the second display area according to the folding. According to the present embodiment, the third display area 730 is folded in the direction of the second display area 720 so that the front surface of the second display area 720 and the front surface of the third display area 730 become in contact with each other, and the front surface of the first display area 720 and the back surface of the third display area 730 are exposed to the outside. The display 110 may display an image through the front surface of the first display area 710 and the back surface of the third display area 730.

The second display area 720 may be divided to have a margin area other than the area covered by the third display area 730, as shown in FIG. 7B.

The controller 130 may change transparency and a rendering state for each area. Specifically, the controller 130 may maintain the transparency of the first display area 710 and display a screen optimized to the size of the first display area 710.

In addition, the controller 130 may change the second display area 720 to an opaque state and display a screen of optimum brightness and color so that the user is not hindered from viewing by the covering of the third display area 730. In this case, the controller 130 does not display a screen on the third display area 730 and maintains optimum transparency to allow information displayed on the second display 720 to be seen through the third display area 730.

Alternatively, the controller 130 may not display a screen on the second display area 720 and display an optimum screen (for example, by rotating a displayed object in the horizontal direction) on the third display area 730, so that the user is not hindered from viewing information displayed on the third display area 730 by the second display area 720.

Figure 8A:
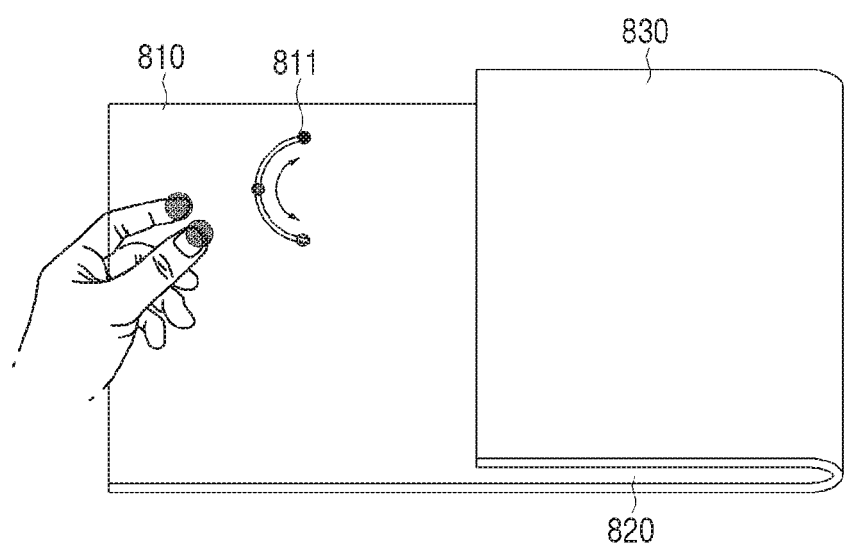
FIGS. 8A and 8B illustrate a method for recognizing a touch according to an exemplary embodiment.
Figure 8B:
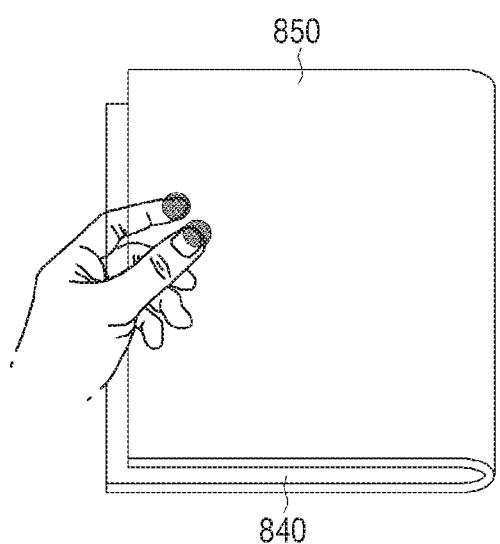

FIGS. 8A and 8B illustrate a method for recognizing a touch according to an exemplary embodiment.

According to an exemplary embodiment, the controller 130 may differently control a touch activation state for each of the plurality of areas divided by the folding of the display apparatus 100.

For example, as shown in FIG. 8A, the controller 130 may control an area 810 which is not folded by folding of a certain area of the display apparatus 100 to maintain original transparency and be able to recognize a touch on both side surfaces. In addition, a GUI 811 for guiding transparency adjustment may be provided on the corresponding area.

In addition, an area 820 which is not exposed by folding may inactivate both side surface touch panels to prevent a touch recognition error.

In addition, an area 830 which covers the non-exposure area 820 may inactivate the both side surface touch panels to prevent the touch recognition error and provide user convenience. However, the front surface touch panel may be activated according to user setting.

In another example, in response to the display apparatus 100 being folded in half as shown in FIG. 8B, a non-exposure area 840 generated by the folding may inactivate the both side surface touch panels to prevent a touch recognition error, and an area 850 covering the non-exposure area 840 may activate only the front surface touch panel.

However, in a one-person viewing mode, user's privacy can be protected and a contrast ratio (CR) can be improved by displaying a curtain on the area 850 covering the non-exposure area 840, and changing the area 840 which is not exposed by folding to an opaque state or changing color. In addition, in a two-person viewing mode, only the touch panel provided on the front surface which is exposed by the folding may be activated and the touch panel provided on the rear surface which is in contact with the display may be inactivated.

Figure 9A:
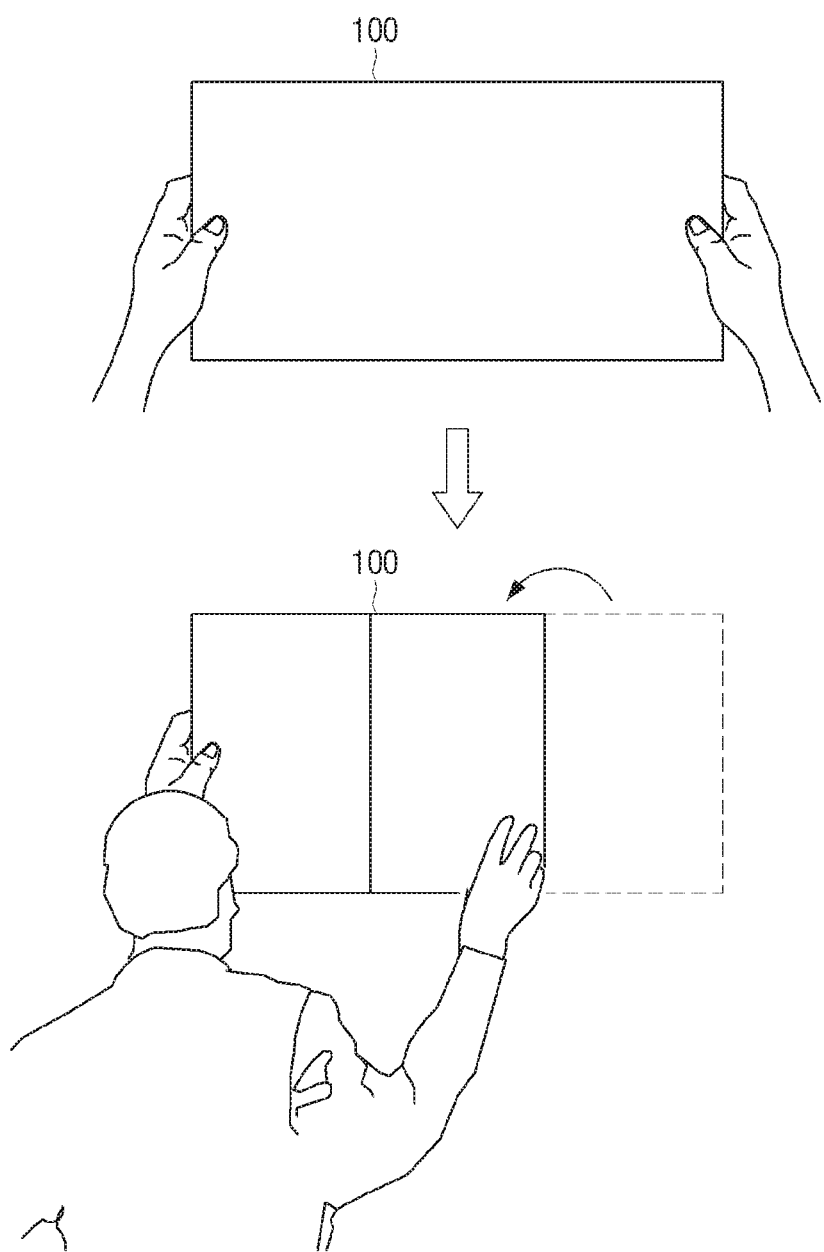
FIGS. 9A to 9C illustrate a method for providing a personalization mode according to another exemplary embodiment.
Figure 9B:
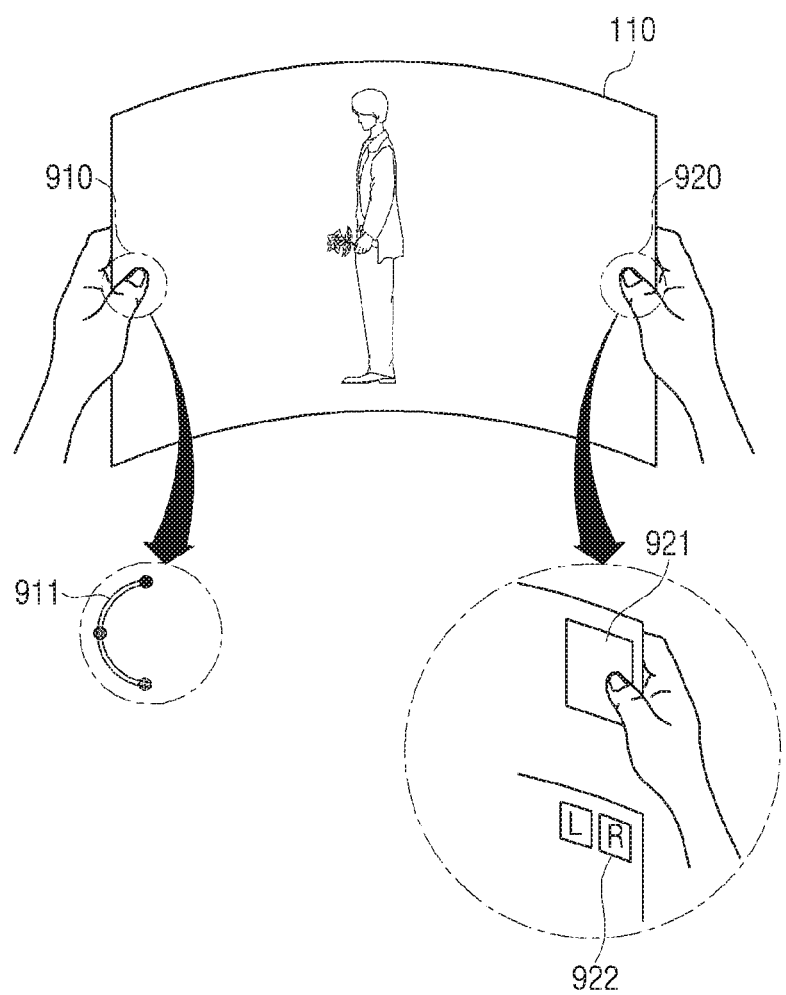
Figure 9C:
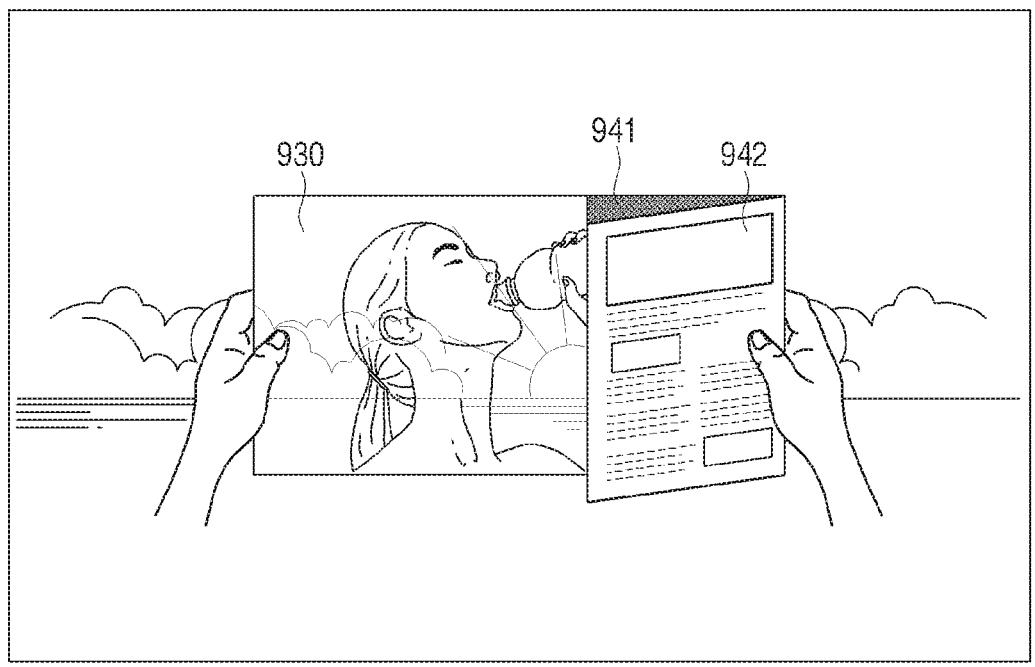

FIGS. 9A to 9C are views to illustrate a method for providing a personalization mode according to another exemplary embodiment.

FIG. 9A is a view to illustrate a method for determining a personalization mode according to a folding manipulation. Referring to FIG. 9A, in response to folding of the display apparatus 100 being detected, the display apparatus 100 may detect a location of a folded area and a user's gaze direction and determine whether the display apparatus 100 enters the personalization mode or not. Specifically, in response to a less folded area being consistent with a user's gaze direction, the display apparatus 100 may determines that the display apparatus 100 enters the personalization mode, that is, a one-person viewing mode.

FIGS. 9B and 9C are views to illustrate a method for providing a user interface (UI) in the personalization mode.

In response to a bending manipulation being performed on opposite sides of the display apparatus 100 as shown in FIG. 9B, the display apparatus 100 may provide a personalization menu on the locations 910 and 920 gripped by the user. For example, the display apparatus 100 may provide a menu 921 and 922 which interworks with contents such as a mouse or a keypad on one side, and provide an information protection menu 911 to adjust transparency/color on the other side. In this case, the display apparatus 100 may recognize a user's gaze direction and process an inwardly curved surface as an output screen and process an outer surface to be in an opaque state.

In response to one side of the display apparatus 100 being bent as shown in FIG. 9C, the display apparatus 100 may display information on an exposed side 942 of a folded area and process an hidden side 941 to be in opaque state. In addition, an area 930 which is not folded may maintain original transparency and render a UI screen to fit the screen size. More specifically, the display 110 of the display apparatus 100 includes a front display surface and a back display surface which are respectively in a direction to the user and in a direction opposite to the user before being folded. The display 110 may be folded to have a first display area 930, a second display area 941, and a third display area 942. As a result of the folding, the front and back display surfaces of the first display area 930 and the back display surface of the third display area 942 are exposed to the outside of the display 110, and the front surface of the second display area 941 and the front surface of the third display area 942 are hidden from the outside of the display 110. The sensor 120 may determine such a folding state of the first, second, and third display areas 930, 941, and 942. The folding state may be classified into a unfolded state, an exposed folded state, and an unexposed folded state. The first and the second display areas 930 and 941 may correspond to the unfolded state, the back display surface of the third display area 942 may correspond to the exposed folded state, and the front display surface of the third display area 942 may correspond to the unexposed folded state. The sensor 120 may also determine a position of the user in relation to each of the first, second, and third display areas 930, 941, and 942. The controller 130 may control a transparency level of the first, second, and third display areas 930, 941, and 942 based on a result of the determining the folding state and the user's position in relation to each of the first, second, and third display areas 930, 941, and 942. For example, the controller 130 may adjust the transparency level of the back display surface of the first and second display area 930 and 941, which is in the direction opposite to the user, to be opaque, and maintain the transparency level of the front display surface of the first display area 930 and the back display surface of the third display area 942 which are in the direction to the user.

Figure 10:
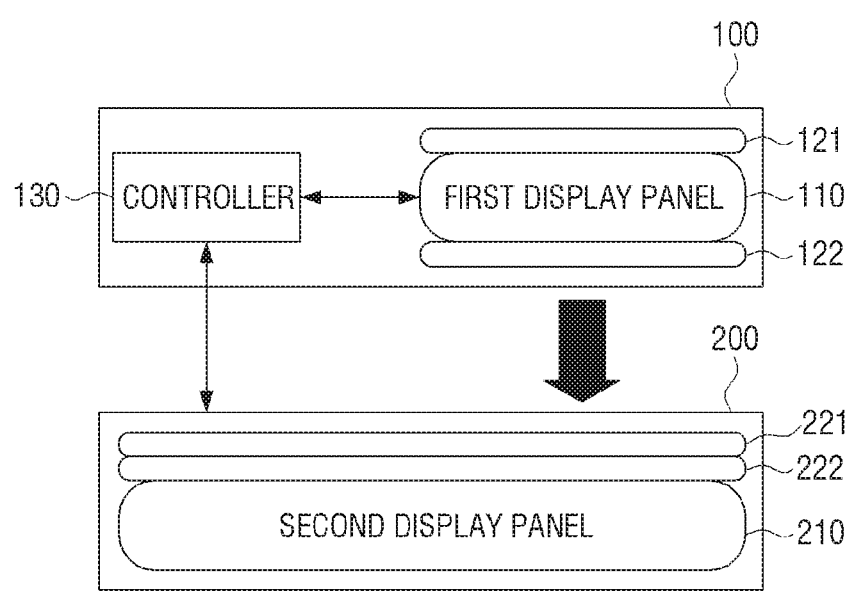
FIG. 10 illustrates a method for communicating with an external apparatus according to another exemplary embodiment.

FIGS. 10A and 10B illustrate a method for communicating with an external apparatus according to another exemplary embodiment.

Referring to FIG. 10A, a first display apparatus 100 according to an exemplary embodiment includes a first display panel 110, and first and second touch panels 121 and 122 which are provided on the opposite sides of the first display panel 110. The first display panel 110 has features of adjusting transparency and may be provided with a touch panel formed only on one side according to an exemplary embodiment.

A second display apparatus 200 may include a second display panel 210 and a third display panel 221, and, according to an exemplary embodiment, may further include an input panel 222 of a non-contact method.

In response to the first display apparatus 100 being placed on the second display apparatus 200, a connection module (e.g., communicator 150) provided in the first display apparatus 100 may recognize that the display apparatuses are in contact with each other and may transmit corresponding information to the controller 130. In this case, the controller 130 may connect a network and stop a part or entirety of the second touch panel 122 and the third touch panel 221 recognizing a touch. In this case, the connection module may recognize the display overlapping or being placed on the other display using a near field communication (NFC) method, or may recognize the display overlapping using a camera, a proximity sensor 127, or a multi touch input sensor 124 in addition to NFC. In addition, the controller 1300 may stop the third touch panel 221 from recognizing a touch according to a coordinates synchronization method, and activate the non-contact type input panel 222.

The controller 130 may control both the first display panel 110 and the second display panel 210 based on a user input on the first touch panel 121 by connecting the display apparatuses with each other.

In particular, when the two display apparatuses 100 and 200 are connected with each other, the controller 130 may synchronize coordinates and direction of a location where the first display apparatus 100 is placed by comparing pattern information reproduced in the second display panel 210 and user input information received through the first touch panel 121. In response to the pattern information not being reproduced in the second display panel 210, the third touch panel 221 may serve to synchronize, and the non-contact type input panel 222 may serve to provide synchronization information in case information on the placing direction of the display apparatus is required even if the coordinates are synchronized, or more exact coordinates synchronization is required.

FIGS. 11A to 11D illustrate a method for synchronizing coordinates and a direction between display apparatuses according to another exemplary embodiment.

Figure 11A:
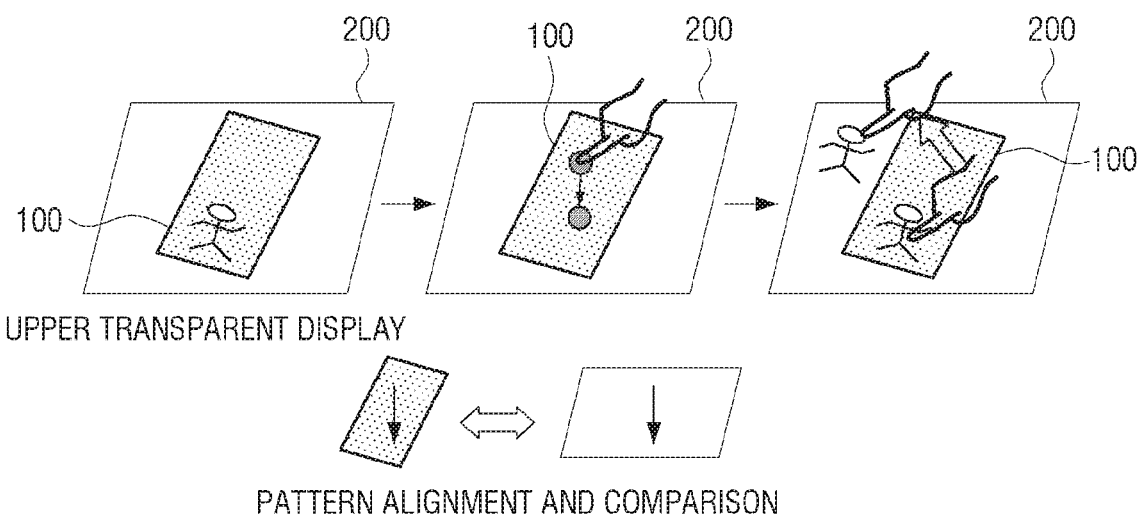
FIGS. 11A to 11D illustrate a method for synchronizing coordinates and direction between display apparatuses according to another exemplary embodiment.

Referring to FIG. 11A, in response to a first display apparatus 100 being placed on a second display apparatus 200 according to an exemplary embodiment, a network between the two display apparatuses 100 and 200 is established and the second display apparatus 200 may stop recognizing a touch on a part or entirety of the screen.

Next, the second display apparatus 200 reproduces a pattern (touch point) for synchronizing location and direction on the location where the first display apparatus 100 is placed, and the first display apparatus 100 is in the transparent state.

Next, in response to a user connecting two touch points by dragging on the transparent first display apparatus 100, the first display apparatus 100 may synchronize the location on coordinates of the screen and the orientation of the first display apparatus 100 by comparing corresponding input information and the touch point reproduced in the second display apparatus 200.

Thereafter, the first display apparatus 100 converts into the screen which was finally used by the user and exchanges information with the second display apparatus 200 according to a user input.

Figure 11B:
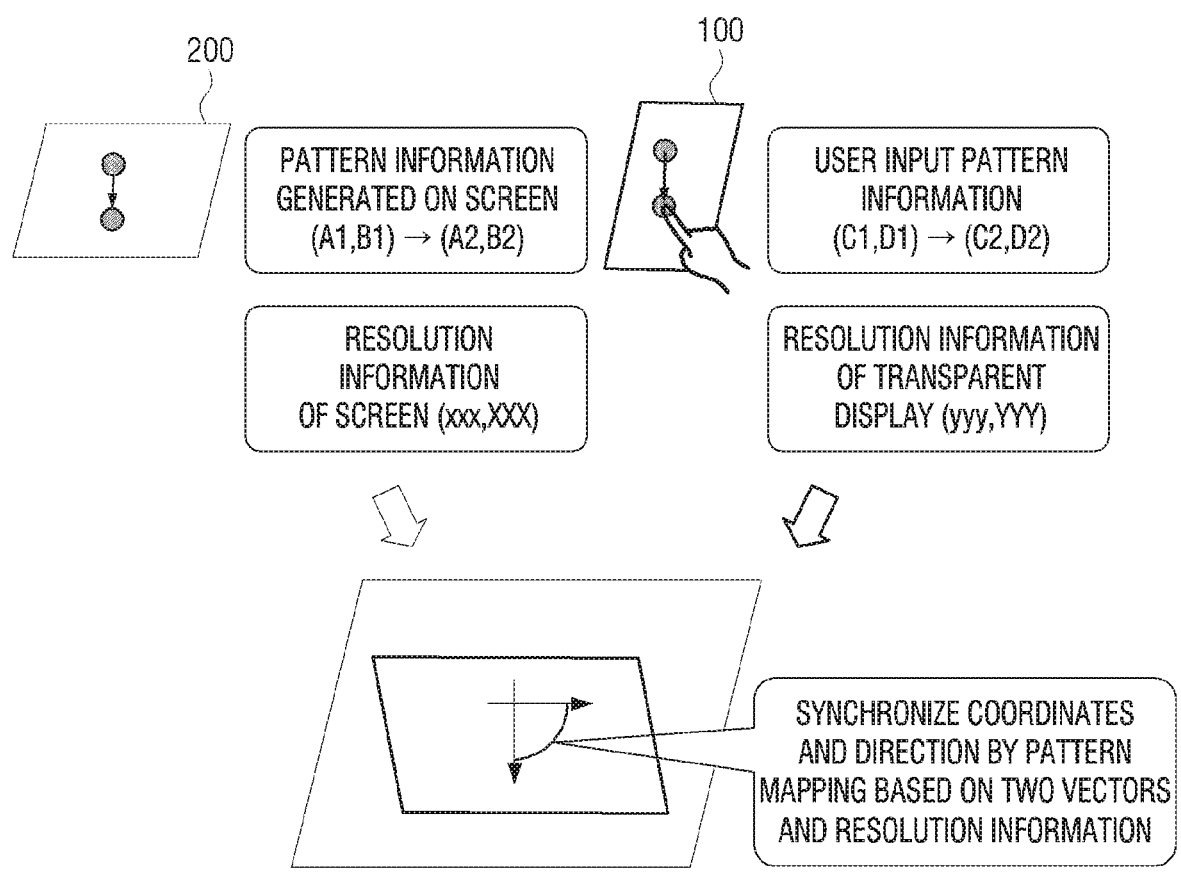

FIG. 11B is a view to illustrate the method for synchronizing coordinates and orientation shown in FIG. 11A in detail. As shown in FIG. 11B, the first display apparatus 100 is placed on the second display apparatus 200. When a user draws a pattern (e.g., line) on the first display apparatus 100, the first display 100 recognizes the pattern by detecting coordinates of the start point and the end point of the pattern. Then, the controller 130 of the first display apparatus 100 may compare the recognized user input pattern with a pattern reproduced on the second display apparatus 200 in view of their respective resolutions. The user input pattern of the first display apparatus 100 and the reproduced pattern of the second display apparatus 200 may be represented as vectors. Next, an angle value between the user input pattern of the first display apparatus 100 and the reproduced pattern of the second display 200 is calculated, and coordinate values reflected when the pattern is reproduced in the second display apparatus 200 are reflected using the calculated coordinate values and angle value.

Figure 11C:
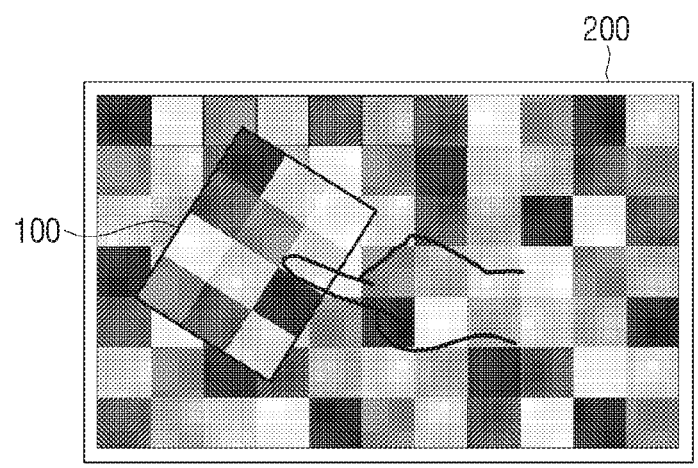

Referring to FIG. 11C, in response to the first display apparatus 100 being placed on the second display apparatus 200, a contact surface sensor of the first display apparatus 100 recognizes the second display apparatus 200 and exchanges parameters for calculating physical sizes, such as a resolution of the display, a pixel pitch, and the like, with the second display apparatus 200 by connecting to the second display apparatus 200 in Bluetooth or NFC. Next, the first display apparatus 100 transmits a calibration image fitting the screen size of the second display apparatus 200 to synchronize the location, and, in response to the image being displayed on the second display apparatus 200, the first display apparatus 100 displays a part of the calibration image by considering the resolution and the pixel pitch of the second display apparatus 200.

Next, in response to a user manipulation to compare and align a part of the calibration image displayed on the first display apparatus 100 and the calibration image displayed on the second display apparatus 200 being inputted, coordinates are synchronized by comparing the two images. For example, the location and rotation information may be calculated by finding a corner point of a grid pattern and block matching.

Although FIGS. 11B and 11C describe that the alignment of the two display apparatus 100 and 200 are triggered by a user's touch manipulation to draw a pattern, the present embodiment is not limited thereto. For example, the second display apparatus 200 may detect boundary lines of the first display apparatus 100 placed on the second display apparatus and use the boundary lines as vectors corresponding to the user input pattern of the first display apparatus 100. The second display apparatus 200 may detect the boundaries of the first display apparatus 100 by using at least one of a pressure sensor, a weigh sensor, and a contact image sensor.

Figure 11D:
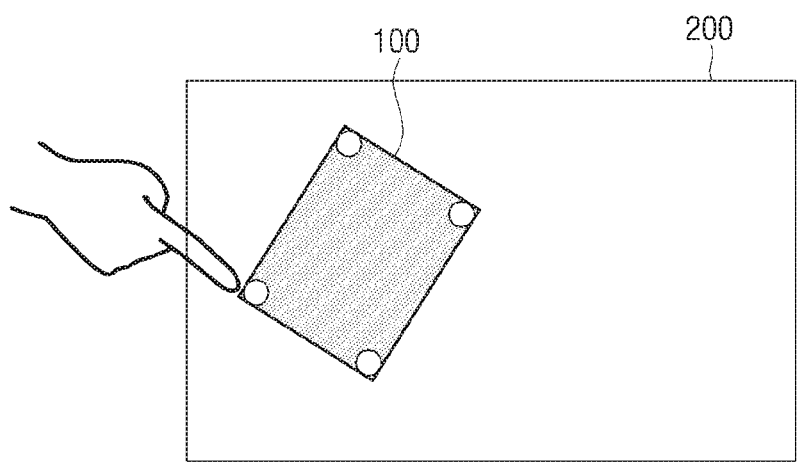

Referring to FIG. 11D, when the second display apparatus 200 supports a non-contact input method (for example, hovering), according to a user input touching a specific corner point, the first display apparatus 100 may receive a touch input and the second display apparatus 200 may receive a non-contact touch input, and locations and direction in which the display is placed may be synchronized.

Figure 12A:
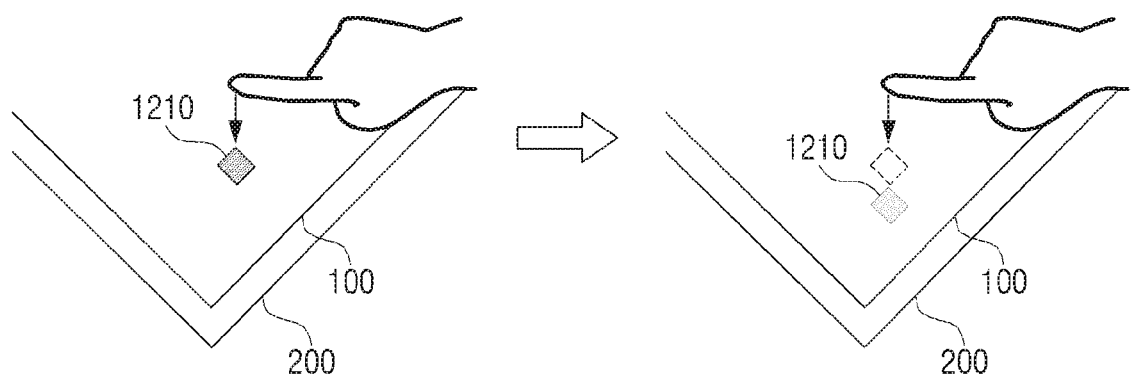
FIGS. 12A and 12B illustrate an example of utilization when coordinates and direction are synchronized between apparatuses according to another exemplary embodiment.
Figure 12B:
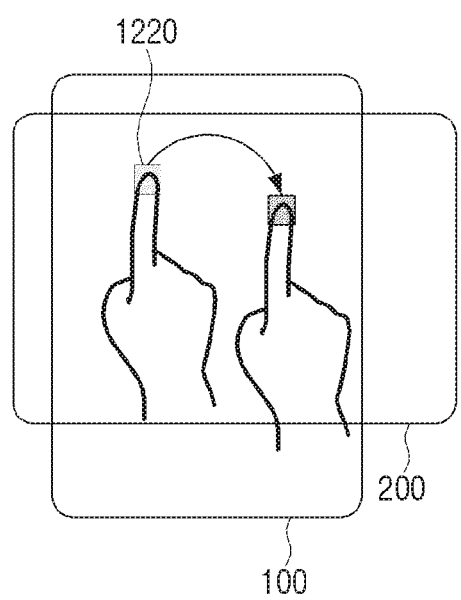

FIGS. 12A and 12B illustrate an example of using the first and second display apparatuses 100 and 200 when coordinates and direction are synchronized between the display apparatuses 100 and 200 according to another exemplary embodiment.

Referring to FIG. 12A, in response to a user input such as a double touch or a touch and hold being inputted on an object 1210 (for example, an icon, an image, a text, and etc.) which is provided in the first display apparatus 100 but is not provided in the second display apparatus 200 underneath the first display apparatus 100, the corresponding object may be moved to and displayed on the second display apparatus. To the contrary, in response to a user input such as a double touch and a touch and hold being inputted on an object which is not displayed on the first display apparatus 100 but is displayed on the second display apparatus 200 underneath the first display apparatus 100, the object may be moved to and displayed on the first display apparatus 100.

Referring to FIG. 12B, when an object is displayed on the first and second display apparatuses 100 and 200 at the same location, the first and second display apparatuses 100 and 200 may recognize the object simultaneously according to a user input such as a double touch and a touch and hold. For example, in response to a user pressing and holding the object and then dragging, the object may be moved within the same display. However, in response to a user double touching and holding the object, the object may be moved to the other display.

Figure 13:
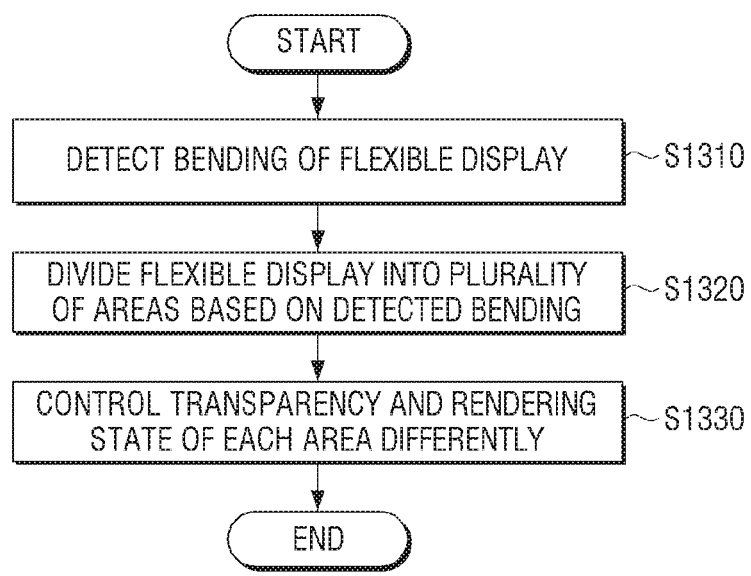
FIG. 13 is a flowchart to illustrate a method for controlling a display apparatus according to an exemplary embodiment.

FIG. 13 is a flowchart to illustrate a method for controlling a display apparatus according to an exemplary embodiment.

According to the method for controlling the display apparatus shown in FIG. 13, the display apparatus 100 detects bending of the display 110 to adjust the transparency of the display 110 (operation S1310). Next, the display apparatus 100 divides the display into a plurality of areas based on the detected bending, and differently controls transparency and a rendering state of each of the plurality of areas (operation S1320).

In operation S1320, when the display 110 is detected as being folded, the display apparatus 100 may recognize the display 110 into a first display area in which an exposure state is maintained, a second display area which changes to a non-exposure state, and a third display area which covers the second display area according to the folding, and differently control transparency and a rendering state of each display area.

Further, the display apparatus 100 may maintain the transparency of the first display area and adjust a rendering state to fit the screen size of the first display area, adjust the transparency of the third display area and adjust a rendering state to fit the screen size of the third display area, and change the second display area to be in an opaque state.

In addition, in response to the display apparatus 100 entering a personalization mode according to the detected bending, the control method may provide at least one of a content control menu and a transparency adjustment menu to a user grip area.

In addition, the control method may further include recognizing a user gaze direction, and, in response to the display apparatus 100 being bent in a user gaze direction, determining that the display apparatus 100 enters the personalization mode and adjusting a display surface provided in a direction opposite to a bending direction to be in an opaque state.

In addition, the display apparatus 100 includes a flexible display panel 110 having an adjustable transparency, a first touch panel 121 provided on one surface of the flexible display panel 110, and a second touch panel 122 provided on the other surface of the flexible display panel 110, and the control method may differently control a touch activation state of the touch panel corresponding to each area.

The differently controlling the touch activation state may include, in response to folding on a certain area of the display apparatus 100 being detected, dividing the display apparatus 100 into a first display area in which an exposure state is maintained, a second display area which changes to a non-exposure state, and a third display area which covers the second display area according to the folding, and differently controlling the touch activation state of the touch panel corresponding to each area.

The control method may further include displaying a synchronization pattern on the second display area, displaying at least part of the synchronization pattern on the third display area, and synchronizing coordinates between the second display area and the third display area based on a user manipulation on at least part of the synchronization pattern displayed on the third display area In addition, the synchronizing the coordinates may include, in response to a touch interaction being inputted through the third display area, determining a location of the second display area corresponding to the touch interaction based on coordinates information matched according to the synchronization of the coordinates.

In addition, the control method may further include transmitting a synchronization pattern by communicating with the second display apparatus 200 according to an event in which the display of the first display apparatus 100 is in contact with a display of the second display apparatus 200, and, in response to the synchronization pattern being displayed on the second display apparatus 200, providing a UI including at least part of the synchronization pattern, and synchronizing coordinates between the first display apparatus 100 and the second display apparatus 200 based on a user manipulation on the at least part of the synchronization pattern.

The control method according to the above-described various exemplary embodiments may be implemented as a program and provided to a flexible apparatus.

For example, a non-transitory computer readable medium storing a program which detects bending of the display; and divides the display into a plurality of areas based on the detected bending and differently controls transparency and a rendering state of each area may be provided.

In addition, a non-transitory computer readable medium storing a program for performing various methods for determining a screen activation area according to the above-described exemplary embodiments may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display;
   a sensor; and
   a processor configured to:
   based on folding of at least part of the display being sensed by the sensor, identify a plurality of areas in the display based on a folding line of the folding of the display, the plurality of areas including an exposure state area, a non-exposure state area and a covering area, and
   individually control a transparency and a rendering state of each of the plurality of areas,
   wherein the exposure state area, the non-exposure state area and the covering area are different from each other,
   wherein the processor is further configured to:
   individually adjust the transparency of the non-exposure state area according to the folding and the covering area which covers the non-exposure state area according to the folding among the plurality of areas, the exposure state area including a front surface and a rear surface opposite to the front surface, the non-exposure state area including a front surface and a rear surface opposite to the front surface of the non-exposure state area, and the covering area including an inner surface facing the front surface of the non-exposure state area and an outer surface opposite to the inner surface, and
   individually adjust the rendering state of each of the plurality of areas based on a size of each of the plurality of areas,
   wherein the covering area is adjacent to the non-exposure state area according to the folding, and
   wherein the processor is configured to:
   control a touch activation state for each of the front surface and the rear surface of the exposure state area, each of the front surface and the rear surface of the non-exposure state area and each of the inner surface and the outer surface of the covering area,
   change the transparency of the non-exposure state area to an opaque state according to the folding, and
   change each of the inner surface of the covering area covering the front surface of the non-exposure state area and the front surface of the non-exposure state area to a touch inactivation state according to the folding.

2. The display apparatus of claim 1, wherein, in response to the folding on at least part of the display being identified, the processor is further configured to recognize the display as being divided into a first display area in which an exposure state is maintained, a second display area which changes to a non-exposure state, and a third display area which covers the second display area according to the folding, and individually control a transparency and a rendering state of each of the first, second, and third display areas.

3. The display apparatus of claim 2, wherein the processor is further configured to maintain the transparency of the first display area and adjust the rendering state of the first display area to fit a screen size of the first display area, adjust the transparency of the third display area and adjust the rendering state of the third display area to fit a screen size of the third display area, and change the transparency of the second display area to an opaque state.

4. The display apparatus of claim 1, wherein, in response to entering a personalization mode based on the folding, the processor is further configured to provide at least one of a content control menu and a transparency adjustment menu to a user grip area of the display.

5. The display apparatus of claim 4, further comprising a gaze recognizer configured to recognize a user gaze direction, and
wherein, in response to the display being folded in the user gaze direction, the processor is further configured to identify that the display apparatus enters the personalization mode and adjust a transparency of a surface panel of the display, which is in a direction opposite to a direction of the folding, to an opaque state.

6. The display apparatus of claim 1, wherein the display comprises a flexible display panel having an adjustable transparency, a first touch panel provided on one surface of the flexible display panel, and a second touch panel provided on another surface of the flexible display panel, and
wherein the processor is further configured to individually control a touch activation state of the first and second touch panels corresponding to each of the plurality of areas.

7. The display apparatus of claim 6, wherein, in response to the folding on at least part of the display being identified, the processor is further configured to recognize the flexible display panel as being divided into a first display area in which an exposure state is maintained, a second display area which changes to a non-exposure state, and a third display area which covers the second display area according to the folding, and individually control the touch activation state of the first and second touch panels corresponding to each of the plurality of areas.

8. The display apparatus of claim 7, wherein the processor is further configured to display a synchronization pattern on the second display area and display at least part of the synchronization pattern on the third display area, and synchronize coordinates between the second display area and the third display area based on a user manipulation on the at least part of the synchronization pattern displayed on the third display area.

9. The display apparatus of claim 8, wherein, in response to a touch interaction being inputted through the third display area, the processor is further configured to identify a location of the second display area corresponding to the touch interaction based on coordinates information matched according to the synchronization of the coordinates.

10. The display apparatus of claim 1, further comprising a communicator configured to communicate with another display apparatus, and
wherein the processor is configured to transmit a synchronization pattern to the another display apparatus in response to the display being in contact with the another display apparatus, provide a user interface including at least part of the synchronization pattern in response the synchronization pattern being displayed on the another display apparatus, and synchronize coordinates between the display apparatus and the another display apparatus based on a user manipulation on the at least part of the synchronization pattern.

11. A method for controlling of a display apparatus, the method comprising:
identifying folding of at least part of a display included in the display apparatus;
identifying a plurality of areas in the display based on a folding line of the folding of the display, the plurality of areas including an exposure state area, a non-exposure state area and a covering area; and
individually controlling a transparency and a rendering state of each of the plurality of areas,
wherein the exposure state area, the non-exposure state area and the covering area are different from each other,
wherein the individually controlling comprises individually adjusting the transparency of the non-exposure state area according to the folding and the covering area which covers the non-exposure state area according to the folding among the plurality of areas, the exposure state area including a front surface and a rear surface opposite to the front surface, the non-exposure state area including a front surface and a rear surface opposite to the front surface of the non-exposure state area, and the covering area including an inner surface facing the front surface of the non-exposure state area and an outer surface opposite to the inner surface, and
individually adjusting the rendering state of each of the plurality of areas based on a size of each of the plurality of areas,
wherein the covering area is adjacent to the non-exposure state area according to the folding, and
wherein the method further comprises:
controlling a touch activation state for each of the front surface and the rear surface of the exposure state area, each of the front surface and the rear surface of the non-exposure state area and each of the inner surface and the outer surface of the covering area,
changing the transparency of the non-exposure state area to an opaque state according to the folding, and
changing each of the inner surface of the covering area covering the front surface of the non-exposure state area and the front surface of the non-exposure state area to a touch inactivation state according to the folding.

12. The method of claim 11, wherein the individually controlling comprises, in response to the folding on at least part of the display being identified, recognizing the display as being divided into a first display area in which an exposure state is maintained, a second display area which changes to a non-exposure state, and a third display area which covers the second display area according to the folding, and individually controlling a transparency and a rendering state of each of the first, second, and third display areas.

13. The method of claim 12, wherein the individually controlling comprises maintaining the transparency of the first display area and adjusting the rendering state of the first display area to fit a screen size of the first display area, adjusting the transparency of the third display area and adjusting the rendering state of the third display area to fit a screen size of the third display area, and changing the transparency of the second display area to an opaque state.

14. The method of claim 11, further comprising, in response to entering a personalization mode based on the folding, displaying at least one of a content control menu and a transparency adjustment menu to a user grip area of the display.

15. The method of claim 14, further comprising:
recognizing a user gaze direction, and
in response to the display being folded in the user gaze direction, identifying that the display apparatus enters the personalization mode and adjusting a surface panel of the display, which is in a direction opposite to a direction of the folding, to an opaque state.

16. The method of claim 11, wherein the display comprises a flexible display panel having an adjustable transparency, a first touch panel provided on one surface of the flexible display panel, and a second touch panel provided on another surface of the flexible display panel, and
wherein the method further comprises individually controlling a touch activation state of the first and second touch panels corresponding to each of the plurality of areas.

17. The method of claim 16, wherein the individually controlling the touch activation state comprises, in response to folding on at least part of the display being identified, recognizing the display as being divided into a first display area in which an exposure state is maintained, a second display area which changes to a non-exposure state, and a third display area which covers the second display area according to the folding, and individually controlling the touch activation state of the first and second touch panels corresponding to each of the plurality of areas.

18. A display apparatus comprising:
a flexible display that comprises a front display surface and a back display surface and is foldable to have a plurality of display areas according to a folding line of the folding of the display, the plurality of display areas including an exposure state area, a non-exposure state area and a covering area;
a sensor; and
a processor configured to:
control the sensor to identify a folding state of each of the plurality of display areas and a position of a user in relation to each of the plurality of display areas, the folding state comprising an unfolded state, an exposed folded state, and an unexposed folded state,
identify a size of each of the plurality of display areas, adjust a transparency level of each of the plurality of display areas based on the folding state and the position of the user, and adjust a rendering state of each of the plurality of display areas based on the identified size of each of the plurality of display areas,
wherein the exposure state area, the non-exposure state area and the covering area are different from each other,
wherein the processor is further configured to individually adjust the transparency level of the non-exposure state area according to the folding and the covering area which covers the non-exposure state area according to the folding among the plurality of display areas, the exposure state area including a front surface and a rear surface opposite to the front surface, the non-exposure state area including a front surface and a rear surface opposite to the front surface of the non-exposure state area, and the covering area including an inner surface facing the front surface of the non-exposure state area and an outer surface opposite to the inner surface,
wherein the covering area is adjacent to the non-exposure state area according to the folding, and
wherein the processor is configured to:
control a touch activation state for each of the front surface and the rear surface of the exposure state area, each of the front surface and the rear surface of the non-exposure state area and each of the inner surface and the outer surface of the covering area,
change the transparency level of the non-exposure state area to an opaque state according to the folding, and
change each of the inner surface of the covering area covering the front surface of the non-exposure state area and the front surface of the non-exposure state area to a touch inactivation state according to the folding.

19. The display apparatus of claim 18, wherein the folding state is identified as the exposed folded state when a corresponding one of the plurality of display areas is folded and exposed to the outside of the flexible display, and the folding state is identified as the unexposed folded state when the corresponding display area is folded to be hidden from the outside of the flexible display.

20. The display apparatus of claim 18, wherein the processor is configured to adjust a transparency level of a corresponding one of the plurality of display areas to be opaque in response to the sensor identifying that the corresponding display area is in the exposed folded state and the user is positioned in a direction opposite to the corresponding display area.

* * * * *